(12) United States Patent
Takeuchi et al.

(10) Patent No.: US 7,180,725 B2
(45) Date of Patent: Feb. 20, 2007

(54) ELECTRIC DOUBLE-LAYER CAPACITOR

(75) Inventors: Makoto Takeuchi, Tokyo (JP); Akinori Mogami, Tokyo (JP); Katsumi Koike, Tokyo (JP)

(73) Assignee: Advanced Capacitor Technologies, Inc., Tokyo (JP)

( * ) Notice: Subject to any disclaimer, the term of this patent is extended or adjusted under 35 U.S.C. 154(b) by 0 days.

(21) Appl. No.: 10/547,495

(22) PCT Filed: Mar. 3, 2004

(86) PCT No.: PCT/JP2004/002689

§ 371 (c)(1),
(2), (4) Date: Aug. 31, 2005

(87) PCT Pub. No.: WO2004/079759
PCT Pub. Date: Sep. 16, 2004

(65) Prior Publication Data
US 2006/0164790 A1   Jul. 27, 2006

(30) Foreign Application Priority Data
Mar. 4, 2003   (JP) ............................. 2003-057305
Dec. 22, 2003   (JP) ............................. 2003-424911

(51) Int. Cl.
*H01G 9/00* (2006.01)
*H01G 9/02* (2006.01)

(52) U.S. Cl. ...................... 361/502; 361/503; 252/62.2
(58) Field of Classification Search ................ 361/502, 361/503; 252/62.2
See application file for complete search history.

(56) References Cited

U.S. PATENT DOCUMENTS

2002/0039275 A1* 4/2002 Takeuchi et al. ............ 361/504

FOREIGN PATENT DOCUMENTS

EP              984471 A2 *    3/2000

* cited by examiner

*Primary Examiner*—Eric W. Thomas
(74) *Attorney, Agent, or Firm*—Olson & Hierl, Ltd.

(57) ABSTRACT

Present invention relates to an electric double-layer capacitor having positive and negative electrodes containing nonporous carbon as an electrode active material. In the nonporous carbon, multiple layers of graphene having an average interplanar spacing $d_{002}$ of 0.350 to 0.380 nm have been grown well. The positive and negative electrodes are impregnated with an electrolyte solution. The nonporous carbon is obtained by activating easily graphitizable carbon, which in turn is obtained by calcining needle coke or pitch made infusible. The elctrolyte solution is either a liquid electrolyte having a planar molecular structure or an electrolyte solution consisting of a liquid electrolyte dissolved in an organic solvent.

16 Claims, 11 Drawing Sheets

(a)

(b)

(a)

(b)

(c)

(A)

(B)

(C)

(A)

(B)

ELECTRIC DOUBLE-LAYER CAPACITOR

RELATED APPLICATION

This application is a National Stage Filing of International Application No. PCT/JP2004/002689 filed Mar. 3, 2004.

TECHNICAL FIELD

The present invention relates to an electric double-layer capacitor using a certain carbon material and a liquid electrolyte consisting of cations capable of assuming a planar molecular structure and anions having small ionic van der Waals volumes such as $BF_4^-$, $PF_6^-$, $AsF_6^-$, $ClO_4^-$, or $CF_3SO_3^-$.

BACKGROUND ART

Electric double-layer capacitors that can be electrically charged and discharged with large currrents are promising as electric power storage devices that are charged and discharged frequently such as electric vehicles, solar battery-assisted power supplies, and wind power-assisted power supplies. Therefore, there is a demand for electric double-layer capacitors having high energy densities, being capable of being quickly charged and discharged, and providing excellent durability (for example, see 4th EV/HEV Symposium on State of the Art—Present Circumstances of Capacitor Technology and Forthcoming Problems "International Symposium on State of the Art of Batteries for Electric Vehicles", Executive Committee, Nov. 8, 1999.)

In such an electric double-layer capacitor, a pair of polarizing electrodes are placed opposite to each other via a separator within an electrolyte solution, thus forming positive and negative electrodes. The principle is that electric charge is accumulated in an electric double layer formed at the interface between each polarizing electrode and electrolyte solution. It has been considered that the capacitance of the electric double-layer capacitor is roughly proportional to the area of the polarizing electrodes. Therefore, only activated carbon having large specific surface areas (i.e., having micropore diameters of more than about 2 nm) has been used as the active material for polarizing electrodes in the past (e.g., Patent Laid-Open No. 2002-15958).

In contrast, the present inventors and others have proposed electric double-layer capacitors having excellent capacitances and withstand voltages and using the conventionally employed electrolyte and carbon materials having characteristics entirely different from those of the aforementioned activated carbon (Patent Laid-Open Nos. H11-317333, 2000-77273, and 2002-25867).

Research is also underway on electrolytes. Wilkes and others have announced that ethyl methylimidazolium (EMI) salts have excellent thermal stability and high ionic conductivity as liquid electrolytes which are liquids at room temperature (also known as room temperature molten salts or ionic liquids), and that the EMI salts are liquids which are stable even in air (John S. Wilkes et al., *J. Chem. Soc., Chem. Commun.*, 1992, pp. 965–7). Furthermore, Carlin and others have announced that $AlCl_4^-$ salts and $BF_4^-$ salts of 1-ethyl-3-methylimidazolium (EMI) and 1,2-dimethyl-3-propylimidazolium (DMPI) act as electrolytes and, furthermore, intercalate/deintercalate from graphite electrodes electrochemically and thus act as a simple battery (DIME battery) (Richard T. Carlin et al., *J. Electrochem. Soc.*, Vol. 141, No. 7, pp. L73–L76 (1994)).

Then, various attempts have been made. In known techniques, the above-described 1-ethyl-3-methylimidazolium (EMI) is used as the liquid electrolyte in electric double-layer capacitors using activated carbon or EMI is dissolved in an aprotic organic solvent and used as an electrolyte (Patent Laid-Open No. 2002-110472 and U.S. Pat. No. 2,945,890). Another known liquid electrolyte assumes a quaternary ammonium salt structure (Patent Laid-Open No. H11-297355). In further known liquid electrolytes, the substituent group of imidazolium has been replaced (Patent Laid-Open Nos. 2002-175948 and 2002-222740).

DISCLOSURE OF THE INVENTION

Under these circumstances, electric double-layer capacitors that are power storage devices are required to have higher withstand voltage and larger capacitance, to be stabler, and to be capable of being charged and discharged quickly, i.e., have higher energy density and higher power density. However, the aforementioned DIME battery has a voltage of only about 3 V. Also, the efficiency is low. Furthermore, the electric double-layer capacitor disclosed in Patent Laid-Open No. 2002-110472 has only a voltage of 3.9 V and a maximum capacitance density of about 19.3 F/cm³. This electric double-layer capacitor is not sufficiently satisfactory in terms of energy density and power density. In addition, the electric double-layer capacitor as described in Patent Laid-Open No. H11-317333 is required to be improved further.

Accordingly, the present invention is intended to propose an electric double-layer capacitor having higher energy density and power density than have been required heretofore. After discussing the mechanism of producing these higher energy density and power density, we provide an electric-double layer capacitor based on novel mechanisms.

It is important to stabilize the capacitance value and improve the withstand voltage in order to improve the energy density. Also, it is important to improve the response speed and reduce the internal resistance, for improving the power density.

The inventors and others have proposed a novel electric double-layer capacitor in the above-cited Patent Laid-Open No. 2000-77273. In particular, a carbon material proposed by us is used as an electrode active material. The capacitor uses an electrolyte solution consisting of a solvent of propylene carbonate and a solute of a $PF_6$ salt of ethyl methylimidazolium (EMI). The obtained characteristics are superior to those of the prior art activated carbon type electric double-layer capacitor but the capacitance has a small value of 25 F/cm³. Hence, this capacitor cannot find wide acceptance in various applications. As a result of subsequent discussions and research, we have succeeded in discovering that the main cause lies in the carbon material. Specifically, as shown in the embodiment of the above patent citation, the carbon material is distilled and activated. These processing steps are appropriate. However, coconut carbon is used as the raw material and so various porous structures intrinsic to vegetable carbons are reflected. This results in many micropores and a large BET specific surface area of 750 m²/g. It has been found that the cause is that this carbon material is a so-to-speak intermediate material between the prior art activated carbon and nonporous carbon.

The inventors and others have already shown an electric double-layer capacitor in Patent Laid-Open No. 2002-25867. In particular, carbon having well grown layers of graphite (multilayered graphene) is thermally treated and activated. More preferably, the carbon is thermally treated under the presence of hydrogen. This nonporous carbon has an average interplanar spacing $d_{002}$ of 0.360 to 0.380 nm and a specific surface area of less than 270 m$^2$/g. An electrolyte consisting of cations of quarternary alkyl ammonium salt and anions of BF$_4$, PF$_6$, or the like is used. This electrolyte is dissolved in a solvent consisting of one of acetonitrile, ethylene carbonate, and propylene carbonate or a mixture thereof. The nonporous carbon is dissolved in the solvent at a concentration of more than 0.5 mol/L and used as an electrolyte. This capacitor shows a high energy density. This nonporous carbon has almost no micropores, and the surface forming an electric double layer is quite small in the initial stage. However, during the process of the first charging, electrolyte ions intercalate between the layers electrochemically together with the solvent, forming an electric double layer. Then, the electrode behaves similarly to so-called activated carbon electrodes while maintaining a high energy density. The electrode has these characteristics.

Accordingly, the present inventors and others have conducted discussions earnestly in an attempt to achieve an electric double-layer capacitor having still higher energy density, and have found that quite high energy density and power density can be accomplished by using electrodes made of this nonporous carbon and employing a liquid electrolyte as an electrolyte, the liquid electrolyte consisting of cations assuming a planar molecular structure and anions having a small ionic van der Waals volume such as $BF_4^-$, $PF_6^-$, $AsF_6^-$, $ClO_4^-$, or $CF_3SO_3^-$. The mechanism was discussed in detail together with the characteristics of the nonporous carbon. In this way, the electric double-layer capacitor of the invention has been completed.

That is, the electric double-layer capacitor according to the present invention has positive and negative electrodes containing an electrode active material consisting of nonporous carbon having well grown multiple layers of graphene having an average interplanar spacing $d_{002}$ in the range of 0.350 to 0.380 nm. The positive and negative electrodes are impregnated with an electrolyte. This nonporous carbon is obtained by activating easily graphitizable carbon, which in turn is obtained by calcining petroleum coke or needle coke that is known as one kind of coal coke or calcinining petroleum- or coal-based pitch that has been made infusible. Furthermore, the electrolyte is a liquid electrolyte consisting of cations capable of assuming a planar molecular structure and anions having a small ionic van der Waals volume such as $BF_4^-$, $PF_6^-$, $AsF_6^-$, $ClO_4^-$, or $CF_3SO_3^-$.

With respect to the above-described average interplanar spacing $d_{002}$, the spacing was at first considered preferable to assume a range of from 0.360 to 380 nm in the same way as the case where a quarternary ammonium salt is used as an electrolyte. It has been found, however, that in a case where a liquid electrolyte consisting of cations capable of assuming a planar molecular structure and anions having a small ionic van der Waals volume is used as an electrolyte as in the present invention, if a nonporous carbon having an average interplanar spacing $d_{002}$ of about 0.350 nm is used, preferable results are also obtained. As a result, the preferable range of the average interplanar spacing $d_{002}$ of the nonporous carbon used in the invention is from 0.350 to 0.380 nm.

The electric double-layer capacitor according to the invention is constructed as described above and can be characterized as follows. A liquid electrolyte is dissolved in an organic solvent, producing an electrolyte solution. This solution can be used as the electrolyte of this capacitor. This electric double-layer capacitor has positive and negative electrodes containing an electrode active material consisting of nonporous carbon having well grown multiple layers of graphene having an average interplanar spacing $d_{002}$ of 0.350 to 0.380 nm. The positive and negative electrodes are impregnated with an electrolyte. This nonporous carbon is obtained by activating easily graphitizable carbon, which in turn is produced by calcining needle coke or pitch made infusible. Furthermore, the electrolyte is a mixture of a liquid electrolyte consisting of cations capable of assuming a planar molecular structure and anions having a small ionic van der Waals volume such as $BF_4^-$, $PF_6^-$, $AsF_6^-$, $ClO_4^-$, or $CF_3SO_3^-$ and an organic solvent. Preferably, this organic solvent is one selected from the group consisting of propylene carbonate, ethylene carbonate, dimethyl carbonate, diethyl carbonate, dimethoxymethane, diethoxyethane, γ-butyrolactone, acetonitrile, and propionitrile or a mixture solvent of at least two of them. The concentration of the electrolyte within the electrolyte solution needs to be higher than 0.5 mol/L. Preferably, the concentration is higher than 1.0 mol/L.

The electric double-layer capacitor according to the invention has positive and negative electrodes containing an electrode active material made of a nonporous carbon that is made of graphite-like crystallitic carbon as described in Patent Laid-Open No. 2002-25867, the crystallitic carbon having an average interplanar spacing $d_{002}$ of about 0.360 to 0.380 nm. This nonporous carbon does not have micropores which have large enough to accept various electrolytic ions, solvents, and N$_2$ gas. The specific surface area as measured by the BET method is less than 270 m$^2$/g, preferably less than 100 m$^2$/g. This nonporous carbon is an activated nonporous carbon obtained by activating easily graphitizable carbon, which in turn is produced by calcining petroleum coke, needle coke known as one kind of coal or calcining petroleum- or coal-based pitch that has been made infusible. Calcined carbon is obtained by thermally treating or calcining the easily graphitizable carbon at 650–850° C., the carbon having well grown layers of graphitic crystallites of needle coke or pitch made infusible. The calcined carbon is processed at 800–900° C. together with a caustic alkali such as KOH. The remaining alkali components are removed by heated water vapor. If necessary, the carbon is thermally treated within a reducing gas flow such as hydrogen in the presence of a catalyst of a transition metal of Ni, Fe, or Co or without using a catalyst to remove activated oxidized hydrogens (such as COOH, CHO, and OH) present on the surface of the carbon.

The nonporous carbon having a small average interplanar spacing $d_{002}$ of 0.350 to 0.360 nm can be prepared by replacing the kind of the raw carbon material, increasing the temperature at which the carbon is heated within the reducing gas stream such as hydrogen, or performing this heating treatment under a pressurized condition.

It is checked whether the activated oxidized hydrogens present on the surface of the carbon have been removed by observing the $^1$H resonance by pulsed NMR spectroscopy of powdered carbon. The amount of hydrogen directly bonded to carbon skeletons and appearing as a short relaxation time component $T_2$=20 to 50 μsec (Gaussian type) is found. The amount of hydrogen existing as chemically bonded adsorbed water (such as COOH, CHO, and OH) and appearing as a moderate relaxation time component $T_2$=50 to 400 μsec (Lorentzian type) is found. Also, the amount of hydrogen existing as physically adsorbed water and appearing as a long relaxation time component $T_2$=500 to 2000 μsec or longer (Lorentzian type) is found. A judgment can be performed according to the amounts of the hydrogens existing in the carbon in the various states. The short relaxation time component $T_2=20$ to 50 μsec (Gaussian type) observed at $^1$H resonance of pulsed NMR spectroscopy, moderate relaxation time component $T_2=50$ to 400 μsec (Lorentzian type), and long relaxation time component $T_2=500$ to 2000 μsec (Lorentzian type) are found. These relaxation time components show differences in the state of bonding of hydrogens remaining in the carbon tissue. Where these relaxation time components are found, it is desirable that the long relaxation time component do not exist at all and that the ratio of the moderate relaxation time component to the short relaxation time component be less than one-third.

SUMMARY OF THE INVENTION

The electric double-layer capacitor according to the present invention uses an electrolyte that is a liquid electrolyte consisting of a salt made up of cations capable of assuming a planar molecular structure and anions having a van der Waals volume in the range of 0.01 to 0.06 nm$^3$. The cations are made of a compound given by the following general formula:

[Chemical Formula 1]

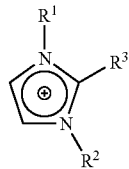

where R$^1$ and R$^2$ are straight-chained alkyl groups respectively having carbon numbers of 1 to 5 and R$^3$ is hydrogen or a straight-chained alkyl group having a carbon number of 1 to 5. Preferably, R$^3$ is hydrogen, and the cations are 1,3-dialkylimidazolium in which R$^1$ and R$^2$ are alkyl groups selected from the group consisting of methyl, ethyl, n-propyl, and n-butyl. Alternatively, the cations are 1,2,3-triallkylimidazolium in which R$^1$ to R$^3$ are alkyl groups selected from the group consisting of methyl, ethyl, n-propyl, and n-butyl. Preferably, anions having van der Waals volumes in the range from 0.01 to 0.06 nm$^3$ are BF$_4^-$, PF$_6^-$, AsF$_6^-$, ClO$_4^-$, or CF$_3$SO$_3^-$.

Unlike the activated carbon electrodes of the prior art capacitor, in this nonporous carbon, any interface forming an electric double layer does not substantially exist when the device, or capacitor, is assembled. During the initial charging, when the applied voltage exceeds a certain threshold value, electrolytic ions co-intercalate with the solvent into the carbon tissue. This is known as solvent co-intercalation. At this time, an interface forming an electric double layer is formed for the first time. Subsequently, this interface is maintained by a hysteresis effect. In consequence, the device functions effectively as an electric double-layer capacitor.

The electric double-layer capacitor according to the invention has a wide range of operating temperatures, large capacitance, and high withstand voltage. The energy density is quite high. Furthermore, the internal resistance during discharging is small. Consequently, a capacitor having an excellent power density is offered.

The present disclosure relates to subject matter contained in Japanese Patent Application No. 2003-57305, filed on Mar. 4, 2003 and Japanese Patent Application No. 2003-424911, filed on Dec. 22, 2003, the disclosure of which is expressly incorporated herein by reference in its entirety.

B shows cases where only liquid electrolyte EMI•BF$_4$ was used alone. The capacitors were charged and discharged repeatedly at a set voltage of 3.3 V. C shows cases where a solution of Et$_3$MeN•BF$_4$ was used as an electrolyte solution. The capacitors were charged and discharged repeatedly at a set voltage of 3.3 V.

Figure 8:
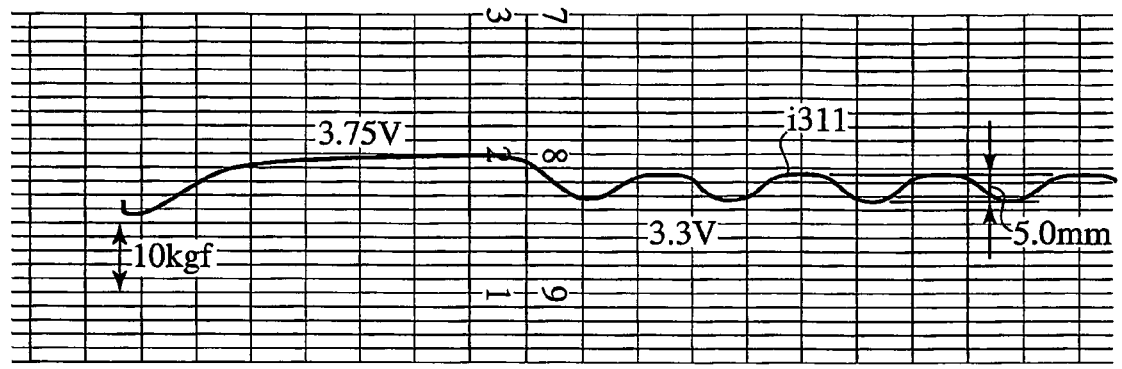
FIG. 8 shows charts of the measurements of expansion pressures of electric double-layer capacitors of the invention. In the figure, A shows cases where liquid electrolyte EMI•BF$_4$ was used alone. The capacitors were initially charged at a set voltage of 3.75 V. Then, the capacitors were charged and discharged repeatedly at a set voltage of 3.3 V.
Figure 8:
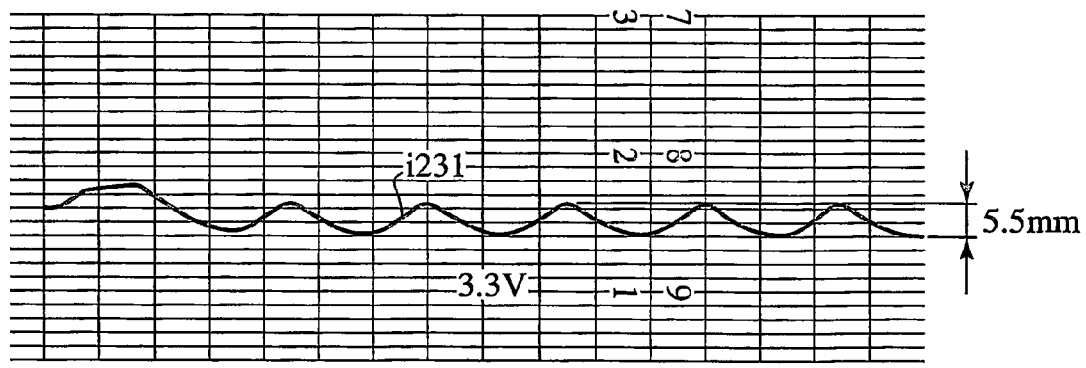
Figure 8:
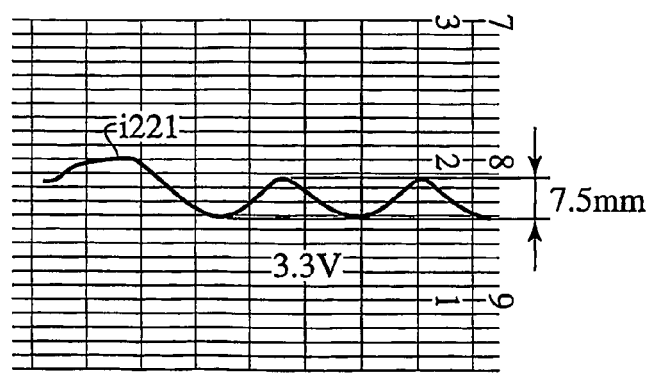
Figure 9:
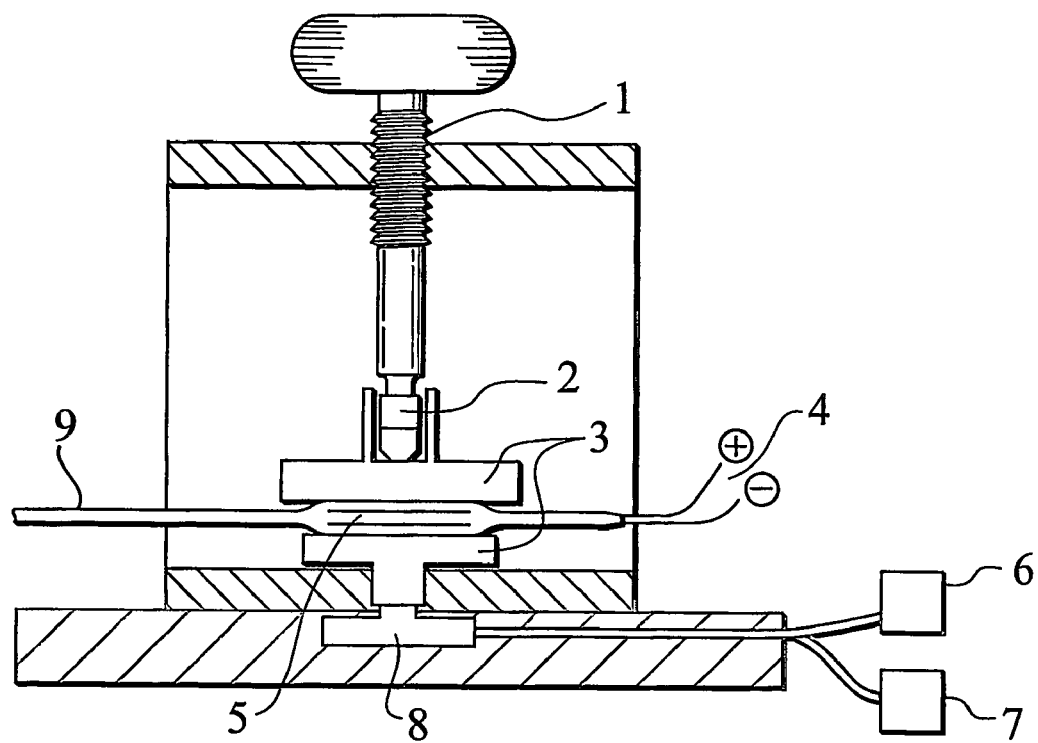

FIG. 9 is a schematic view of a jig used to measure the expansion pressures illustrated in FIG. 8, the jig being capable of limiting the volume in the direction of electrodes and of monitoring the produced pressure. In FIG. 9, 1 denotes a screw, 2 denotes a thrust bearing, 3 denotes an Al-Block, 4 denotes output leads of an EDLC to charge-discharge device, 5 denotes an EDLC, 6 denotes a DC 5.0V power supply, 7 denotes a recorder, 8 denotes a strain gauge, and 9 denotes a vacuum pack.

Figure 10:
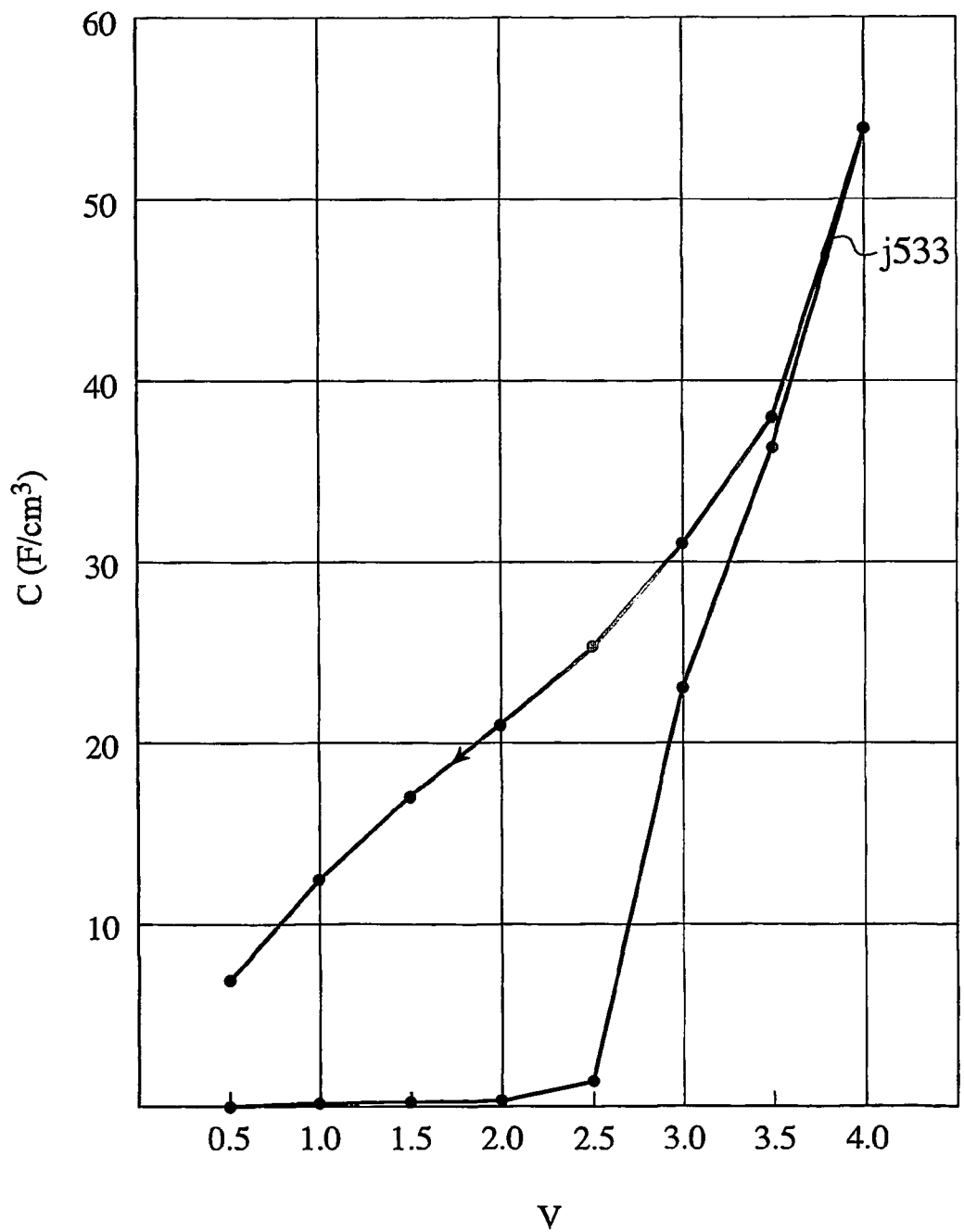

FIG. 10 is a graph showing the capacitance-applied voltage characteristics of electric double-layer capacitors of the invention at 50° C., and in which the arrow indicates the order of measurements.

Figure 11:
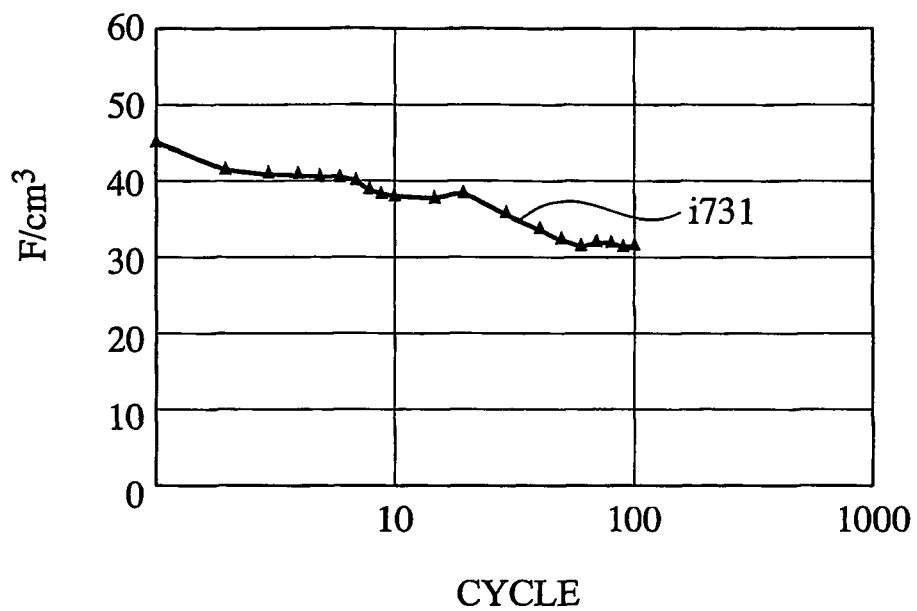
Figure 11:
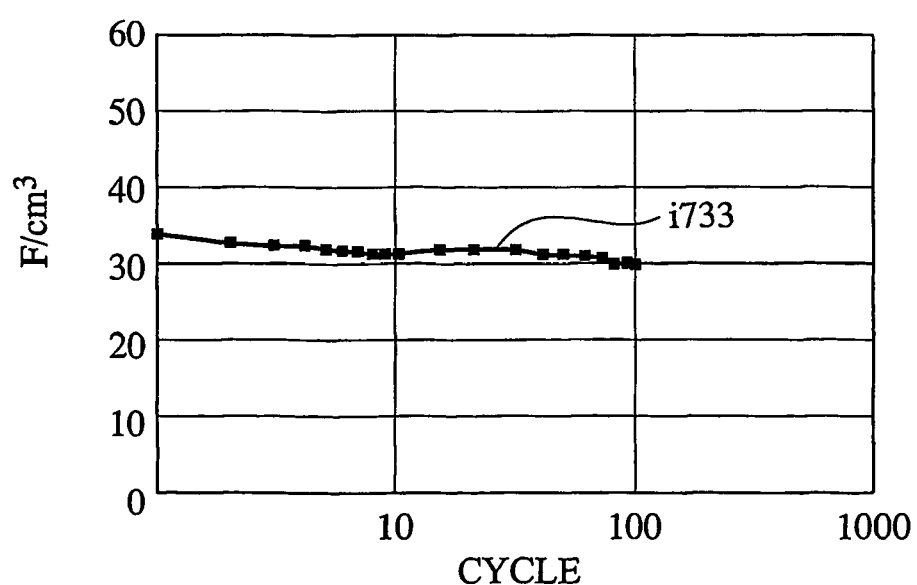

FIG. 11 shows graphs showing the cycle characteristics of electric double-layer capacitors of the invention. In the figure, (A) indicates a case where the applied voltage was set to 4.0 V. (B) indicates a case where the applied voltage was set to 3.5 V.

DETAILED DESCRIPTION OF THE INVENTION

To fabricate an electric double-layer capacitor (EDLC) according to the present invention, a carbon material used for the capacitor is first prepared. Polarizing electrodes (carbon electrodes) are fabricated from this carbon material. These electrodes are used as positive and negative electrodes and immersed in a liquid electrolyte having a planar molecular structure or in an electrolyte solution consisting of this liquid electrolyte dissolved in an organic solvent, thus preparing the capacitor.

Especially, where a liquid electrolyte is used, production of capacitance by the electric double-layer capacitor according to the invention, i.e., storage of electrical energy, is performed as follows. At the beginning of the electric double-layer capacitor, any interface forming an electric double layer does not substantially exist. During initial charging, if the applied voltage exceeds a certain threshold value, the ions of the electrolyte themselves co-intercalate with the ionic molecules of the carrier into the carbon tissue. (Cations and anions of molecules forming ion pairs are in a liquid state, i.e., their spatial positions relative to each other can vary. When the co-intercalation occurs, the threshold voltage is determined by the cations having a greater ion volume.) At this time, an interface forming an electric double layer is created for the first time. Subsequently, the interface is maintained by a hysteresis effect. This interface forms the electric double layer and stores electrical energy up to a certain voltage. At higher applied voltages, intercalation of mainly electrolyte ions themselves alone into the carbon tissue stores electrochemical energy. Because of this mechanism, high withstand voltage, high energy density, and high power density can be accomplished.

The negative and positive electrodes used in the present invention contain a nonporous carbon as an electrode active material. This nonporous carbon is a nonporous carbon as described in Patent Laid-Open No. 2002-25867. In particular, the average interplanar spacing $d_{002}$ of graphite-like crystallites of carbon is about 0.350 to 0.380 nm. The specific surface area measured by the BET method is 270 m$^2$/g, preferably less than 100 m$^2$/g. The nonporous carbon does not have micropores which are large enough to accept various electrolyte ions, solvent, and N$_2$ gas. This carbon can be obtained by the following method.

This nonporous carbon is obtained by activating easily graphitizable carbon. This graphitizable carbon is obtained by calcining petroleum coke-based or coal coke-based needle coke or calcining petroleum- or coal-based pitch that has been made infusible. These needle cokes and pitches made infusible which are used as raw materials are directly thermally treated in a temperature range of 300 to 500° C. and classified into gas, oil, and solid matter. The solid matter is raw coke and pulverized to below 120 μm, thus obtaining "raw material carbon". This "raw material carbon" is thermally treated in an inert ambient (e.g., in a nitrogen ambient) at 650–850° C., preferably at 700–800° C. for 2 to 4 hours (preheat treatment), resulting in calcined carbon. The calcined carbon is mixed with a caustic alkali such as KOH at a weight ratio of 1:1.8–2.2, preferably about 1:2. The mixture is heated at 800–900° C., preferably about 800° C., again in an inert ambient (e.g., in a nitrogen ambient) for 2 to 4 hours and activated with the caustic alkali. Then, the alkali remaining in the carbon is removed in the manner described below.

The removal of the alkali is performed by cleaning the obtained alkali-activated carbon by a procedure described below, for example. Carbon particles of more than 1 μm are recovered from the alkali-activated carbon and filled into a stainless column. Pressurized water vapor with 120–150° C. and 10 to 100 kg•f (preferably, 10 to 50 kg•f) is kept introduced into the column until the pH of the vented water reaches about 7 normally for 6 to 10 hours. After the end of the removal of alkali, an inert gas such as argon or nitrogen is passed through the column and dried, thus obtaining the desired carbon material.

To remove the alkali more thoroughly, the following method can be adopted, preferably using a pressurizable Soxhlet extractor: (1) an aqueous solution of a volatile acid (such as HCl or HNO$_3$) is refluxed, and the remaining alkali is extracted from the powder of the carbon material using acid-heated water vapor of a comparatively high concentration; (2) then, an aqueous solution of a nonvolatile alkali (e.g., NaOH or KOH) is refluxed, the remaining acid is flushed away with water vapor, and trapped neutrally with an alkali, and (3) then the obtained carbon material is heated and dried.

If necessary, the "nonporous carbon" obtained as described above is further thermally treated at 500–900° C. for 4 to 6 hours within a reducing ambient of 3H$_2$+N$_2$ mixture gas or hydrogen gas, for example, the mixture gas being obtained by decomposing NH$_3$. Alternatively, the carbon is thermally treated at 200–850° C. for 2 to 6 hours within a reducing ambient under the presence of a catalyst of a transition metal such as Fe, Co, or Ni or a transition metal compound. Consequently, active oxidized hydrogens (such as COOH, CHO, and OH) other than hydrogen directly bonded to the carbon skeleton are removed. A nonporous carbon blocked with hydrogen can be obtained.

In the above-described method of preparing the nonporous carbon, the processing conditions including the activation processing temperature and the thermal treatment temperature in the reducing ambient affect the average interplanar spacing $d_{002}$ of the obtained nonporous carbon. A carbon having a smaller average interplanar spacing $d_{002}$ can be obtained, for example, by elevating the processing temperature. For example, a nonporous carbon having an average interplanar spacing $d_{002}$ in the range of 0.350 to 0.360 nm can be obtained by elevating the activation processing temperature to about 900° C. or elevating the thermal processing temperature in a reducing gas stream to about 700–900° C. One effective method is to perform the thermal treatment within the reducing gas stream under an increased pressure. Where a liquid electrolyte consisting of cations capable of assuming a planar molecular structure and anions having a small ionic van der Waals volume is used as an electrolyte as in the present invention, a carbon having an average interplanar spacing $d_{002}$ of about 0.350 nm can also be used. However, this nonporous carbon does not assume a perfect graphite structure. One feature of the nonporous carbon used in the electric double-layer capacitor according to the invention is that multiple layers of graphene which are not yet fully graphitized and have an average interplanar spacing $d_{002}$ of 0.350 to 0.380 nm have been grown well.

Because of the thermal treatment in the reducing ambient as described above, active oxidized hydrogens (such as COOH, CHO, and OH) other than hydrogen directly bonded to the carbon skeleton are removed. Then, unpaired electrons, or dangling bonds, tend to be produced easily. Especially reactive sites of these dangling bonds are blocked with hydrogen. Therefore, if the nonporous carbon is preserved within the air, it is unlikely that the carbon reacts with water vapor or oxygen within the air; otherwise, the active oxidized hydrogens would be regenerated. The amount of active oxidized hydrogens remaining in the nonporous carbon processed in this way can be measured by the pulsed NMR spectroscopy described in Patent Laid-Open No. 2002-25867. In brief, if a $^1H$ nuclear resonance of the carbon in powdered form is performed using a pulsed NMR spectrometer, a decaying signal is observed from a decaying curve of initial-phase rising intensity in the initial phase. The decaying curve is composed of (in many cases) two or three overlapped components having different relaxation times. One is a component having a short lateral relaxation time $T_2$ of 10 to 50 μsec. This can be approximated by a resonance line showing a Gaussian distribution. This component consists of hydrogen directly bonded to the carbon skeleton. Besides, there is a moderate relaxation time component having a lateral relaxation time $T_2$ of 50 to 400 μsec showing a Lorentzian distribution. This is attributed to functional groups of oxygen and hydrogen such as COOH, CHO, and OH. In addition, there is a long relaxation time component having a still longer relaxation time $T_2$ of 500 to 2000 μsec and showing a Lorentzian distribution. This is attributed to physically adsorbed water. Accordingly, the amount of the active oxidized hydrogens can be found from the ratio of the components having these relaxation times.

Of these components, the long relaxation time component attributed to physically adsorbed water can be easily removed by heating and drying the carbon material at above 100° C. in a vacuum, or at a reduced pressure, below $10^{-5}$ Torr, for example. The carbon material can be entirely freed from this component. However, the moderate relaxation component attributed to hydrogen mainly bonded to hetero atoms such as O (oxygen) within the carbon skeleton cannot be removed by this technique relying on heating and drying at a reduced pressure. This component cannot be removed unless the above-described heating treatment in a reducing ambient is performed.

Accordingly, a nonporous carbon having a less amount of moderate relaxation component attributed to hydrogens (active oxidized hydrogens) bonded mainly to hetero atoms such as O (oxygen) in the carbon skeleton, i.e., the ratio of the sum of the moderate relaxation time component $T_2$ of 50 to 400 μsec (Lorentzian type) and the long relaxation time component $T_3$ of 500 to 2000 μsec (Lorentzian type) to the short relaxation time component $T_2$ of 10 to 50 μsec (Gaussian type) is less than one-third, is preferable in the present invention. Since the long relaxation time component $T_3$ of 500 to 2000 μsec (Lorentzian type) that is physically adsorbed water is substantially null, if the ratio of the moderate relaxation time component $T_2$ of 50 to 400 μsec (Lorentzian type) to the short relaxation time component $T_2$ of 10 to 50 μsec (Gaussian type) is less than one-third, preferably less than one-fifth, and if the carbon is used as the carbon active material in the electrodes, gas production and formation of an electrically nonconductive film are prevented. Also, increase in the internal resistance is prevented. Hence, the material is stable. In these respects, the carbon material is desirable.

With respect to the electrolyte solution used in the present invention, a liquid electrolyte having a planar molecular structure can be used intact as an electrolyte. Alternatively, this liquid electrolyte may be dissolved in a nonaqueous organic solvent and used as an electrolyte solution.

The liquid electrolyte used in the present invention is a salt consisting of cations capable of assuming a planar molecular structure and anions having a van der Waals volume in the range of 0.01 to 0.06 $nm^3$. Preferably, the salt is liquid at room temperature.

The "cations capable of assuming a planar molecular structure" means that when ion pairs are formed, cations governing a shape becoming a barrier against intercalation into narrow spaces in carbon material assume a molecular structure that permits the constituent atoms to be arrayed on a plane. Meanwhile, the "anions having van der Waals volumes in the range of 0.01 to 0.06 $nm^3$" means that the anions have ionic radii sufficiently smaller than those of the cations. That is, the cations and anions of the electrolyte molecules of interest are conspicuously different in ionic size. When ion pairs are formed, the cations of larger ionic size create an obstruction to intercalation into narrow spaces in the carbon material. However, if the cations can assume a structure permitting the constituent atoms to be arrayed on a plane, the obstruction to intercalation into the carbon material is mitigated. Especially, the carbon material used in the invention does not have any micropores that adsorb $N_2$ evaluated by the BET method. Instead, planar gaps between the layers of graphene are filled. Therefore, cations capable of assuming a planar molecular structure can co-intercalate with anions having a small ionic volume into the gaps between the layers of the carbon material.

Examples of cations capable of assuming such a planar structure include cations composed of molecules of a substantially planar structure such as heterocyclic five-membered ring and heterocyclic six-membered ring replaced by a straight-chained alkyl group, for example, preferably an aromatic ring structure. Examples of cations of heterocyclic 6-membered ring structure include pyridinium cations, pyrimidium cations, and pyrazinium cations replaced by straight-chained alkyl groups. Examples of cations of heterocyclic 5-membered ring structure include imidazolium cations, pyrazolium cations, 1,2,3- or 1,2,4-triazolium cations, thiazolium cations, isothiazolium cations, oxazolium cations, and isoxazolium cations replaced by straight-chained alkyl groups. Preferable examples of the replacing straight-chained alkyl group include alkyl groups with carbon numbers of 1 to 5. Among them, so-called unbulky alkyl groups such as methyl group, ethyl group, n-propyl group, and n-butyl group are desirable. Preferable cations are shown in Chemical Formula 2.

[Chemical Formula 2]

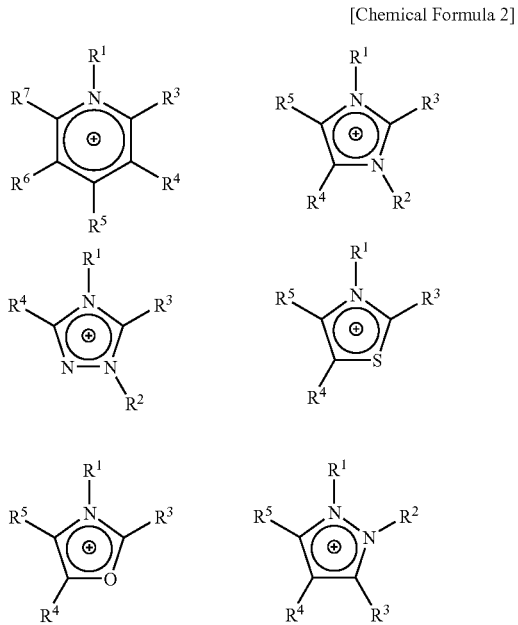

where $R^1$ and $R^2$ respectively indicate straight-chained alkyl groups with hydrogen or carbon numbers of 1–5, preferably straight-chained alkyl groups with carbon numbers of 1–4, especially preferably alkyl groups with carbon numbers of 1–3, and $R^3$ and $R^6$ respectively indicate straight-chained alkyl groups with hydrogen or carbon numbers of 1–5, preferably straight-chained alkyl groups with hydrogen or carbon numbers of 1–4, especially preferably straight-chained alkyl groups with hydrogen or carbon numbers of 1–3.

Among these cations, pyridinium cations and imidazolium cations are preferable. Specific examples of compounds include methylpyridinium cations, ethylpyridinium cations, n-propyl pyridinium cations, n-butyl pyridinium cations, 1,3-dimethyl imidazolium cations, 1,3-diethyl imidazolium cations, 1,3-di-n-propyl imidazolium cations, 1,3-di-n-butyl imidazolium cations, 1-ethyl-3-methyl imidazolium cations, 1-methyl-3-n-propyl imidazolium cations, 1-n-butyl-3-methyl imidazolium cations, 1-ethyl-3-n-propyl imidazolium cations, 1-ethyl-3-n-butyl imidazolium cations, 1-n-propyl-3-n-butyl imidazolium cations, 1-n-butyl-3-n-propyl imidazolium cations, 1,2-dimethyl-3-n-propyl imidazolium cations, and 1,3-dimethyl-2-n-propyl imidazolium cations.

Meanwhile, with respect to the anions, those having van der Waals volumes in the range from 0.01 to 0.06 nm$^3$ are preferable. Each van der Waals volume can be found from a model in which atoms forming ions are bonded with given bonding distance and bonding angle. Among these anions having van der Waals volumes in the range from 0.01 to 0.06 nm$^3$, because of electochemical stability of the electrolyte and their sizes, $BF_4^-$, $PF_6^-$, $AsF_6^-$, $ClO_4^-$, $CF_3SO_3^-$, $AlCl_4^-$, and $SbF_6^-$ are preferable. Especially, $BF_4^-$, $PF_6^-$, $AsF_6^-$, $ClO_4^-$, and $CF_3SO_3^-$ are preferable.

The liquid electrolyte used in the present invention is a salt consisting of a combination of the above-described cations and anions. A selection is made to have an electrolyte which has a wide potential window, low viscosity, high ion conductivity, is liquid over a wide range of temperatures, and is stable. Specific preferable examples of the compound of such liquid electrolyte include 1-ethyl-3-methylimidazolium$^+$•$BF_4^-$, 1-ethyl-3-methylimidazolium$^+$•$PF_6^-$, 1-methyl-3-n-propyl imidazolium$^+$•$BF_4^-$, 1-methyl-3-n-propyl imidazolium$^+$•$PF_6^-$, 1,2-dimethyl-3-n-propyl imidazolium$^+$•$BF_4^-$, 1,2-dimethyl-3-n-propyl imidazolium$^+$•$FP_6^-$, 1,3-dimethyl-2-n-propyl imidazolium$^+$•$BF_4^-$, and 1,3-dimethyl-2-n-propyl imidazolium$^+$•$PF_6^-$. Especially, 1-ethyl-3-methylimidazolium$^+$•$BF_4^-$ and 1-ethyl-3-methylimidazolium$^+$•$PF_6^-$ are preferable in that they are liquids in wide ranges of temperatures, are high in ion conductivity, and are relatively low in viscosity.

Since the above-described liquid electrolytes are liquid at room temperature, they can be used intact as electrolyte solutions (so-called neat electrolyte solutions). In a case of an electrolyte that has a high melting point and is solid at room temperature, it is dissolved in an organic solvent, so that the electrolyte can be used as an electrolyte solution. Furthermore, even electrolytes that are liquids at room temperature can be dissolved in an organic solvent and used. Where an organic solvent is used, a slight decrease in energy density is observed compared with the case where no organic solvent is used. However, the viscosity can be reduced. Especially, the electrolyte is used at low temperatures, increases in the internal resistance due to increase in the viscosity can be prevented with favorable results.

The used organic solvent is selected depending on the solubility of the liquid electrolyte and on the reactivity with the electrodes. Generally, propylene carbonate, ethylene carbonate, dimethyl carbonate, diethyl carbonate, dimethoxymethane, diethoxyethane, γ-butyrolactone, acetonitrile, and propionitrile are examples of the organic solvent. These can be used alone or two or more of them can be used as a mixture solvent.

In the electric double-layer capacitor according to the invention, co-intercalation with the solvent into the carbon tissue occurs and so the solvent is associated with the intercalation start voltage described later. From this viewpoint, it can be said that intercalation occurs more easily when solvent molecules having a smaller molar volume are used. Therefore, where a solvent is used alone, it is desirable to use a smaller molar volume. Furthermore, where a mixed solvent is used, it is desired that a solvent having a smaller molar volume be contained. From these points, it can be shown that where an organic solvent is used alone, propylene carbonate is preferably used. Preferable examples of mixed solvent include a combination of acetonitrile and ethylene carbonate and a combination of acetonitrile and propylene carbonate.

Various types of electric double-layer capacitors such as box type and button type can be assembled using the nonporous carbon and liquid electrolyte as described so far, by a method similar to the method used for the prior art electric double-layer capacitor.

Electrodes can be fabricated by the same method as where the prior art activated carbon is used. For example, where electrodes in the form of sheets are fabricated, the nonporous carbon obtained by the above-described method is tailored to a grain size of about 5 to 100 μm. Then, carbon black, for example, is added as a conductive filler for assisting conductivity to powdered carbon. Polytetrafluoroethylene (PTFE), for example, is added as a binding agent. These materials are kneaded together and pressure-rolled into a sheet. Powdered graphite can be used as the conductivity imparting agent, as well as carbon black. PVDF (polyvinylidene fluoride), PE (polyethylene), and PP (polypropylene) can be used as the binding agent, as well as PTFE. At this time, the mixture ratio by weight of the nonporous carbon, conductive filler (carbon black), and binding agent (PTFE) is generally approximately 10:1–0.5:0.5–0.25.

In order to fabricate each electrode, it is necessary that the nonporous carbon particles and carbon black be distributed uniformly and that they be caught in PTFE fibers with substantially uniform intensity. Therefore, kneading is done sufficiently. Generally, it is necessary to perform pressure rolling laterally and horizontally. The weight of the obtained electrode is measured to indicate the degree of dryness of the electrode. The density of the electrode is found from the apparent volume of the carbon electrode and the weight. Where the electrode density is in the range of 0.8 to 1.2 g/cm$^3$, desirable results concerning capacitance and internal resistance are obtained.

The electrode density mainly arises from the density of the used nonporous carbon. Even where the same nonporous carbon is used, if the electrode density is increased by strong pressing, communication holes for the electrolyte or electrolyte solution will be plugged up. This will tend to increase the internal resistance greatly. It will be difficult to use the device as an electric double-layer capacitor.

Electrodes obtained in this way are overlapped via a separator to form positive and negative electrodes. Then, the electrodes are immersed in a liquid electrolyte or in an electrolyte consisting of an electrolyte solution prepared by dissolving a liquid electrolyte in an organic solvent. In this way, the electric double-layer capacitor of the invention is assembled.

During the assembly, if the liquid electrolyte is used without being dissolved in an organic solvent, the assembly step can be simplified, because the vapor pressure of the liquid electrolyte is almost zero at room temperature and quite low at high temperatures (e.g., 150° C.) and thus the electrolyte withstands vacuum drying.

In particular, in an electric double-layer capacitor as in the present invention, water existing within the system adversely affects the electrical performance. Generally, materials used for assembly holds a trace amount of adsorbed water. Therefore, during assembly, the materials are heated to a high temperature at which the materials are not modified in quality. Thus, the materials are vacuum-dried. However, this dehydration method cannot be used for organic solvents having comparatively high vapor pressures. The dehydration is performed using high-purity active alumina or active silica. On the other hand, where a liquid electrolyte is used, such considerations are not necessary. Carbon electrodes, a separator, and collector electrodes are inserted into a container, and then a liquid electrolyte is injected into the container. Thereafter, the container is vacuum-impregnated at a temperature in excess of 100° C. Thus, water and other volatile organic solvents is can be evaporated off. The capacitor is impregnated with the liquid electrolyte up to every corner. At this time, if polyethylene, polypropylene, low-density pitch (petroleum wax), or the like is added to the top portion when it is being heated above the melting point of the added substance, the container is sealed when the temperature is returned to room temperature because the added substance is lower in density than the liquid electrolyte and does not mix with the electrolyte.

A voltage higher than the rated voltage by 10–20% (normally, about 3.5 to 3.75 V) is applied to the electric double-layer capacitor assembled in this way, thus charging it. The ions of the liquid electrolyte co-intercalate with the liquid electrolyte into the carbon tissue. Under the presence of an organic solvent, it is also intercalated. Subsequently, an electric double layer is formed. Except for a case of an electrolyte solution to which an organic solvent has been added, the ions of the liquid electrolyte itself are intercalated mainly into the carbon tissue by applying a still higher voltage. As a result, a quite high energy density is obtained.

The electric double-layer capacitor according to the present invention is described below in further detail.

Figure 1:
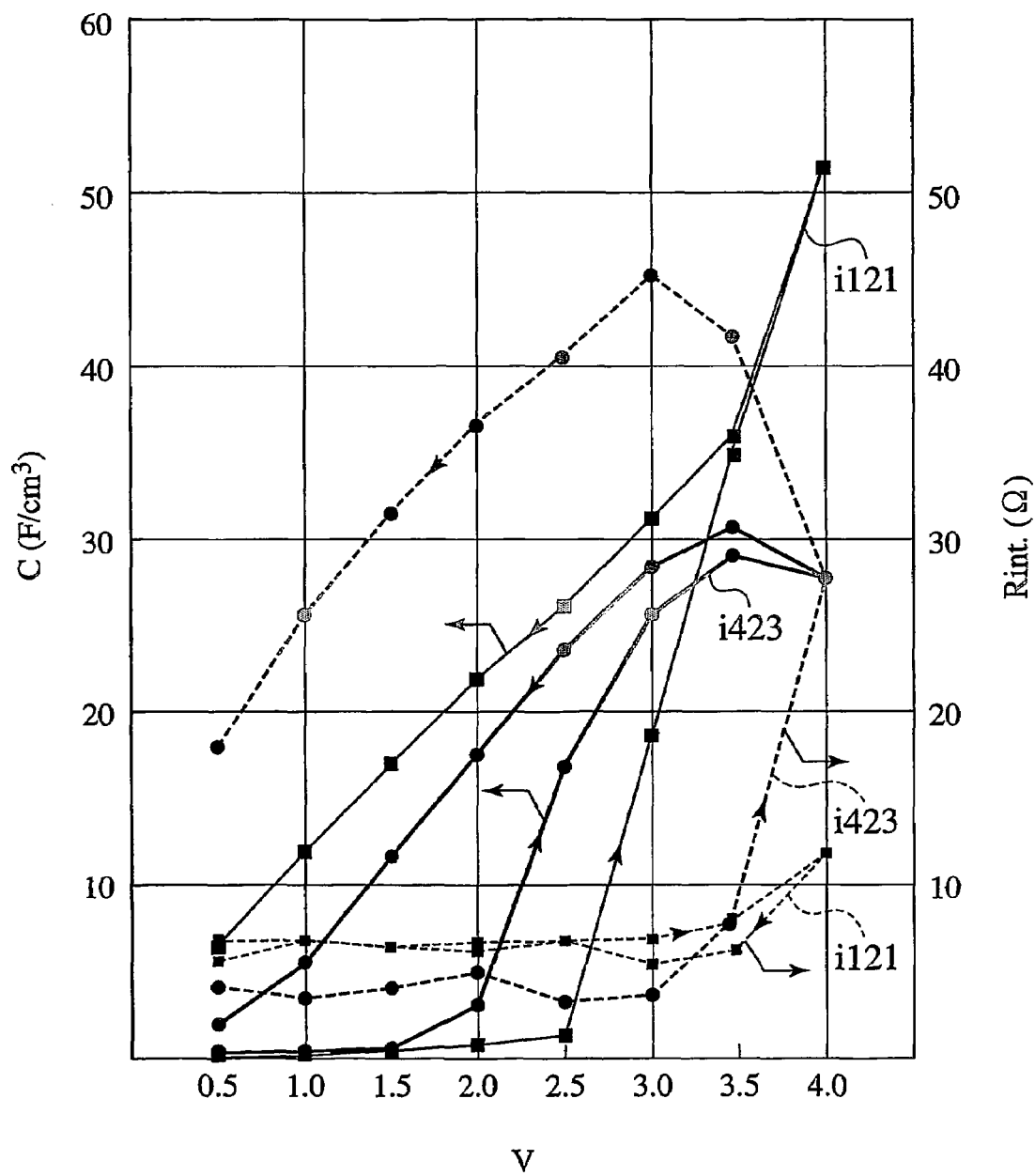
FIG. 1 is a graph showing the capacitance-applied voltage characteristics of electric double-layer capacitors of the present invention. In the figure, ■ i121 indicates the characteristics in cases where nonporous carbon and liquid electrolyte are combined. ● i423 indicates the characteristics in cases where nonporous carbon and electrolyte solution of ammonium salt are combined. The solid lines indicate capacitances C (F/cm$^3$). The broken lines indicate internal resistance values [Rint.(Ω)]. The arrows in the graph indicate the order of measurements.

FIG. 1 shows the capacitance-applied voltage characteristics of the electric double-layer capacitor according to the invention. Each used carbon electrode is fabricated as follows. Needle coke (raw material carbon B) derived from petroleum coke is calcined at 700° C. for 4 hours, producing "calcined carbon". This calcined carbon and two parts of KOH are processed at 800° C. for 4 hours and washed with heated water vapor up to pH=7. Then, alkalis are extracted with aqueous hydrochloric acid using a Soxhlet extractor. The residues are washed with water, heated, and vacuum-dried. Then, under the presence of a catalyst of nickel metal, the residues are thermally processed at 500° C. for 4 hours within hydrogen to remove the nickel catalyst. Thus, a nonporous carbon [B704804S+504H] is prepared. Carbon black and PTFE are added to it at a weight ratio of 10:1:0.5 (nonporous carbon: carbon black: PTFE). The materials are kneaded together and molded into a sheet. The electrode has a diameter of 20 mm, a thickness of about 0.2 mm, and an electrode density of 1.06 g/cm$^3$. An electrolyte solution is vacuum-impregnated into the electrode. Aluminum foil whose surface has been roughened is used as a collector electrode. CTW-GA55-CTW consisting of glass fibers GA-55 squeezed in hard paper is used as a separator. The electrode is vacuum-packed into a laminated polyethylene bag via the separator, thus fabricating a cell for testing.

With respect to each kind of nonporous carbon obtained as described above, the raw material, or carbon, is denoted. The preheat treatment temperature is given by the two upper significant digits. The processing time is denoted at the third position. The activation processing time is denoted at the fourth and fifth positions. The processing time is denoted at the sixth position. In total, 6 digits are added to discriminate the preheat treatment and activation conditions. "S" is attached to the end for each of carbons from which alkalis have been extracted with the Soxhlet extractor. Symbol "+" is attached after the six digits for each kind of nonporous carbon which has been hydrogenated by performing a post heat treatment. Similarly, two upper significant digits indicating the post heat treatment temperature and one lower significant digit indicating the processing time, or three digits in total, are given. Symbol "H" indicating processing within a hydrogen gas stream is attached. Thus, notations are given. [B704804S+504H] attached to the used nonporous carbon as described above describes the preparation method for the nonporous carbon in accordance with the above system of notations. Kinds of nonporous carbon are given below in accordance with these notations.

The $d_{002}$ of the obtained nonporous carbon [B704804S+504H] was 0.360 nm. The specific surface area was about 60 m$^2$/g. The ratio of the moderate relaxation time component to the short relaxation time component (hereinafter simply referred to as the "relaxation component ratio") was less than 0.05.

In FIG. 1, ■ i121 indicates a case where $BF_4^-$ salt of 1-ethyl-3-methylimidazolium (EMI•BF$_4$) is used as the electrolyte solution. ● i423 indicates a case where an electrolyte solution obtained by dissolving BF$_4$ salt of triethylmethyl ammonium (Et$_3$MeN•BF$_4$) in a mixture solvent of acetonitrile (AN) and propylene carbonate (PC) in a volumetric ratio of 1:1 at a concentration of 1.5 mol/L is used. Measurements were performed with 10 mA between both electrodes. Charging and discharging were repeated from 0.5 V to 4 V in steps of 0.5 V while increasing (or reducing) the charging time from 500 seconds in steps of 500 seconds. The capacitance (capacitance per dry unit volume, $F/cm^3$, of the positive and negative electrodes) at each voltage was calculated from the discharging characteristics (indicated by the solid lines). Similarly, the internal resistance was calculated (indicated by the broken lines). Note that the internal resistance value directly indicates the actual value of the cell fabricated. The value has not been normalized at all. The arrows in the graph indicate the order of the measurements.

As can be seen from the figure, in one using an ammonium salt as disclosed in Patent Laid-Open No. 2001-25867, if the applied voltage is increased gradually, a capacitance is produced when a given voltage is exceeded. The rate of increase of capacitance relative to voltage increase after the applied voltage exceeds 3.0 V decreases rapidly. The capacitance rather decreases at 3.5 to 4.0 V. Saturation is almost reached at 3.75 V. Meanwhile, the internal resistance increases rapidly during this interval and does not return if the voltage is decreased. Rather, the resistance increases. Obviously, this means that an irreversible reaction has occurred during this interval. This phenomenon little varies if the electrolyte is replaced by tetraethyl ammonium $BF_4$ salt ($Et_4N \cdot BF_4$).

However, where the electrolyte is $EMI \cdot BF_4$, the rate of increase of capacitance relative to voltage increase does not vary up to the applied voltage of 4.0 V. As a result, the maximum capacitance increased greatly beyond 50 $F/cm^3$.

Also, when the applied voltage is gradually reduced through the maximum applied voltage, a hysteresis effect appears. It can be seen that characteristics that maintain capacitances far greater than the characteristics experienced when the voltage increased are obtained. That is, where $EMI \cdot BF_4$ is used, characteristics and hysteresis effect similar to those where an ammonium salt is used as disclosed in Patent Laid-Open No. 2001-25867 close to the applied voltage of 3.5 V are shown. It can be seen that almost no hysteresis effect appears between 3.5 and 4.0 V and that identical voltage-capacitance characteristics (V-C characteristics) are shown.

Figure 2:
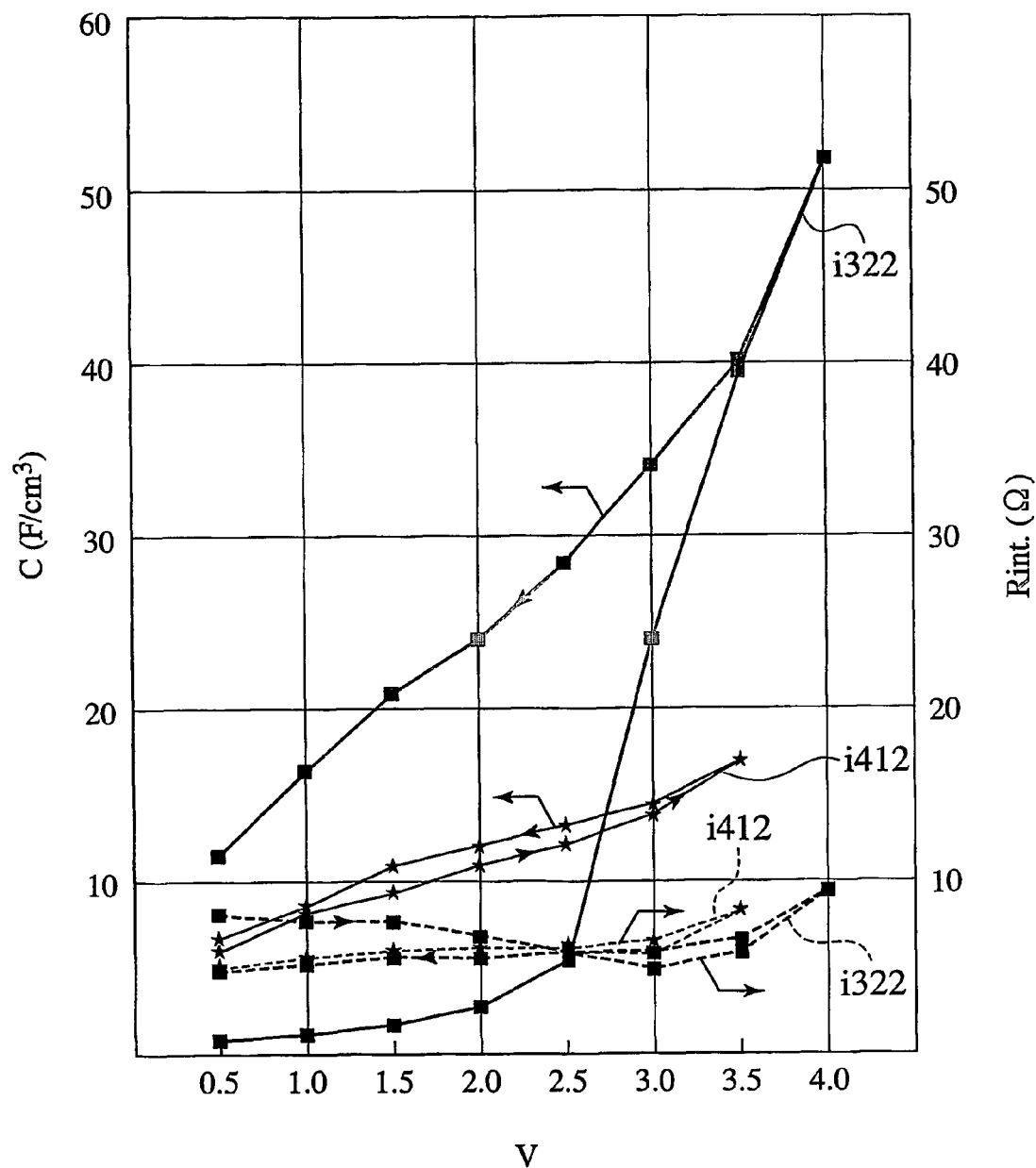
FIG. 2 is a graph showing the capacitance-applied voltage characteristics of electric double-layer capacitors of the present invention, the capacitors using nonporous carbons different from those of FIG. 1. In this figure, ■ i322 indicates the results of cases where EMI•BF$_4$ is used as an electrolyte. ★ i412 indicates the results of cases where electrodes are fabricated using normal activated carbon and EMI•BF$_4$ is used as an electrolyte. The solid lines indicate the capacitances [C(F/cm$^3$)]. The broken lines indicate the internal resistance values [Rint.(Ω)]. The arrows in the figure indicate the order of measurements.

FIG. 2 also shows V-C characteristics similarly to FIG. 1. In the figure, ■ i322 is obtained by examining the V-C characteristics in cases where different nonporous carbons were used. In particular, nonporous carbon [A704804+504H] was prepared using petroleum pitch-based carbon (raw material carbon A) processed so as to be infusible as the raw material carbon. Electrodes were fabricated similarly. $EMI \cdot BF_4$ was used as the electrolyte. The $d_{002}$ of the used nonporous carbon [A704804+504H] was 0.360 nm. The specific surface area was about 100 $m^2/g$. The relaxation component ratio was less than 0.17. ★ i412 shows the V-C characteristics in a case where electrodes were fabricated using normal activated carbon for comparison purposes and $EMI \cdot BF_4$ was used as the electrolyte. The arrows in the graph indicate the order in which measurements were performed. In the case of activated carbon, too, when a voltage of greater than 3.5 V is applied, the internal resistance increases rapidly, and the capacitance increases only slightly. Therefore, the maximum applied voltage was set to 3.5 V during the measurements. The activated carbon is a carbon activated with water vapor. The specific surface area is 1015 $m^2/g$. The micropores have a maximum frequency of about 0.74 nm. The specific surface area was measured in the same way as in the cases of nonporous carbons. That is, Sorptie 1750 and the BET1-point method were used. Nitrogen was used as an adsorption gas. The temperature of the heating furnace was set to 110° C. The range of relative pressures was from 0.05 to 1.35.

It can be seen from FIG. 2 that no hysteresis effect is shown in the case of electrodes of activated carbon and that the capacitance is small.

Figure 3:
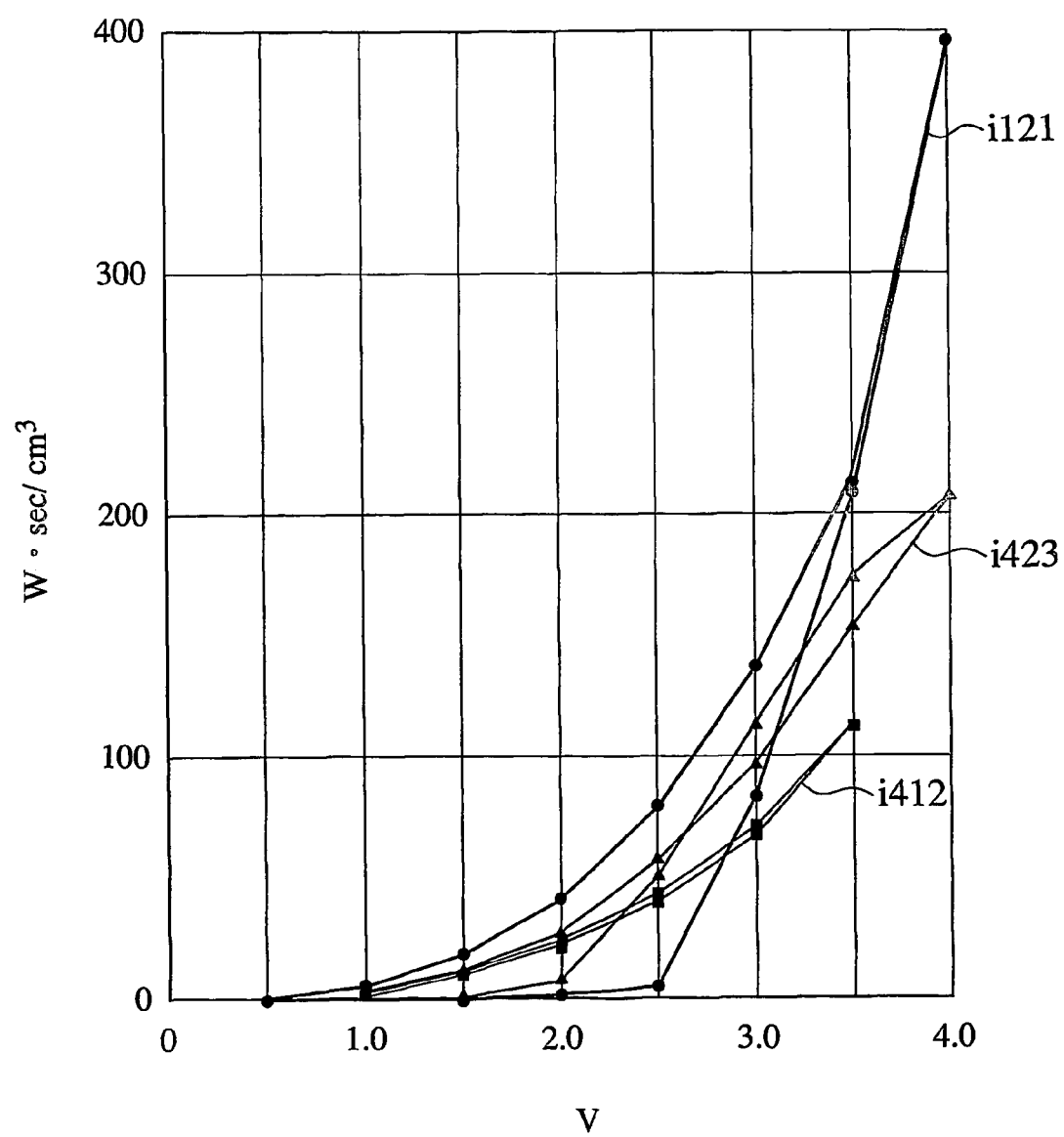
FIG. 3 is a graph showing the relation of the discharge energy density of each electric double-layer capacitor of the invention to the applied voltage. In the figure, ● i121 indicates cases where nonporous carbon and liquid electrolyte are combined. ▲ i423 indicates cases where nonporous carbon and electrolyte solution of ammonium salt are combined. ■ i412 indicates cases where activated carbon and liquid electrolyte are combined.

The relation between the applied voltage and the stored energy is shown in FIG. 3. Since energy increases as the square of voltage, it is important that the operating voltage is high. However, as the voltage increases, an electrochemical reaction more likely to occur, and the life tends to shorten. In FIG. 1, capacitance is plotted against voltage. In FIG. 3, instead of this capacitance $F/cm^3$, discharge energy $W \cdot sec/cm^3$ is plotted against the applied voltage. For reference, cases where carbons were fabricated similarly to the above-described method except that activated carbon was used as an active material are also shown. FIG. 3 shows that where AN/PC solution of $Et_3MeN \cdot BF_4$ was used, results conspicuously different from the apparent capacitance characteristics were obtained. That is, when a voltage exceeding 3.5 V was applied, the internal resistance increased conspicuously. As a result, the discharge energy decreased (▲ i423). It can be seen that ● i121 using the $EMI \cdot BF_4$ of the present invention has a discharge energy about twice as large as that of the electric double-layer capacitor ▲ i423 using an ammonium salt as disclosed in Patent Laid-Open No. 2001-25867 and about four times as large as the discharge energy of the electric double-layer capacitor ■ i412 using the prior art activated carbon and $EMI \cdot BF_4$. That is, it can be understood how much storage and discharge energies can be held in the electric double-layer capacitor of the invention from FIG. 3 where "storage and discharge energies" in the case where $EMI \cdot BF_4$ is used in the prior art activated carbon electrode and "storage and discharge energies" in the case where nonporous carbon electrodes are used are compared directly.

The present inventors and others have discovered this phenomenon and conducted the following discussions to consider the mechanism of producing the capacitance.

To confirm "electrochemical intercalation of ions involving solvent" disclosed in Patent Laid-Open No. 2001-25867, the intercalation start voltages were measured for cases where 1-ethyl-3-methylimidazolium ($EMI^+$) was thinned to solvents of different molar volumes. The molar volume of each solvent is found as "molecular weight/density". The molar volume of 1-ethyl-3-methylimidazolium ($EMI^+$) was found by dividing the molecular weight of $EMI \cdot BF_4$ by the density 1.28 $g/cm^3$ of this liquid, finding the molar volume of the salt itself, and proportioning the volume according to the ratios of the van der Waals volumes 118 $Å^3$ and 48 $Å^3$ (U.S. Pat. No. 5,827,602), respectively, of $EMI^+$ ions and $BF_4^-$ ions. That is, the molar volume of $EMI \cdot BF_4$ is (198/1.28)=154.7 in the non-dissociated case. The molar volume of dissociated $EMI^+$ ions is 154.7×[118/(118+48)]=110.0.

For experiments, cells were created using electrolyte solutions obtained by dissolving $EMI \cdot BF_4$ in propylene carbonate (PC), γ-butyrolactone (GBL), ethylene carbonate (EC), and acetonitrile (AN) at an equal volumetric ratio. Charging/discharging tests were performed. The intercalation start voltages were found from the initial charging characteristics. The used nonporous carbon was nonporous carbon [B704804+504H] prepared using needle coke (raw material carbon B) derived from petroleum coke as the raw material carbon. The $d_{002}$ was 0.360 nm. The specific surface area was about 60 $m^2/g$. The relaxation component ratio was less than 0.05.

Figure 4:
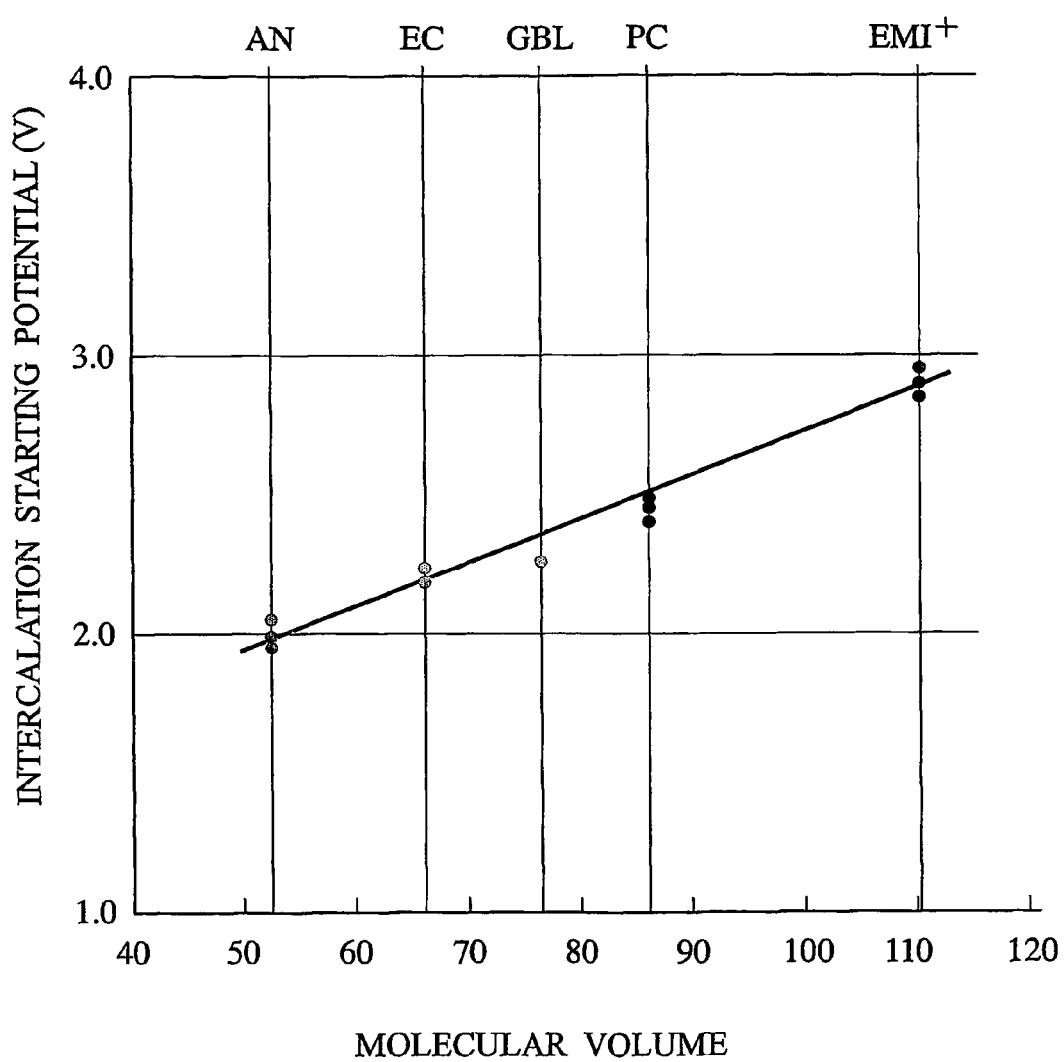
FIG. 4 is a graph showing the relation between the molar volume of solvent and intercalation start voltage.

FIG. 4 shows the results of plotting of the intercalation start voltages against the molar volumes of solvents. It is shown from the figure that each intercalation start voltage is in proportion to the molar volume of the solvent. It can be understood that in the case of EMI•BF$_4$ containing no solvent, cations of 1-ethyl-3-methylimidazolium (EMI$^+$) itself act as a solvent, i.e., carrier of ions.

The great difference between alkyl ammonium cations (such as Et$_4$N$^+$ and Et$_3$MeN$^+$) and EMI$^+$ cations is as follows. The former assumes a three-dimensional structure in which alkyl groups are coordinated in positions where a regular tetrahedron is formed about an N atom. In contrast, it has been found important that with respect to EMI$^+$ cations, imizolium five-membered rings form a plane. Alkyl groups are coordinated within the plane. The whole molecule exists as a plane.

Where ions are attracted into the spaces between the layers of a multilayered graphene structure by a Coulombic force, it is obvious that EMI$^+$ cations capable of assuming a planar structure is more advantageous than alkyl ammonium cations such as Et$_4$N$^+$ and Et$_3$MeN$^+$ of three-dimensional structure. Therefore, it seems that intercalation into narrow spaces heretofore impossible for EMI$^+$ cations to intercalate is enabled and that additional capacitane is created. When a hysteresis effect appears, if it is assumed that solvent stays between layers and causes the effect, ions alone intercalate at 3.5 to 4.0 V. Therefore, it is estimated that almost no hysteresis effect appears.

The charging and discharging characteristics of the electric double-layer capacitor of the present invention are next described.

Figure 5:
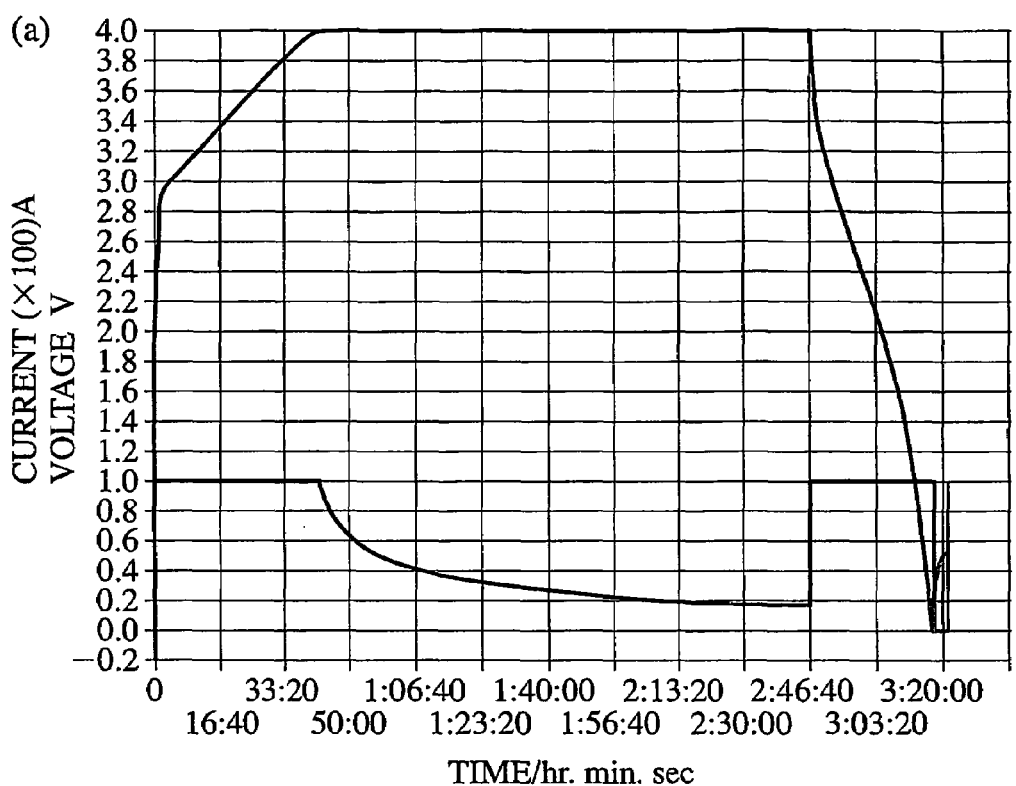
FIG. 5 shows the charge-discharge characteristics of an electric double-layer capacitor of the invention during initial charging (first cycle) in cases where a liquid electrolyte EMI•BF$_4$ is used alone. In the figure, (a) indicates a case where the applied voltage is 4.0 V and (b) indicates a case where the applied voltage is 3.75 V.
Figure 5:
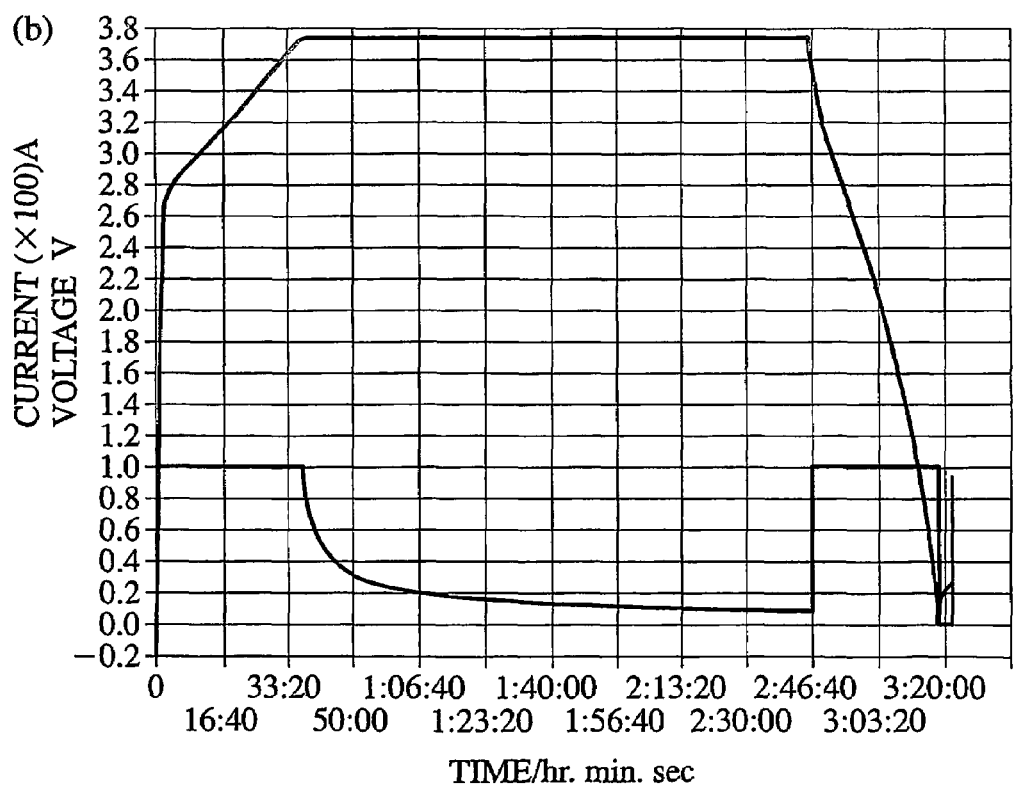

FIG. 5 shows the charging and discharging characteristics of cells using only EMI•BF$_4$. The charging and discharging characteristics were measured as follows. Charging at a constant current was done. As electric charge was accumulated in each capacitor, the voltage was increased. This was monitored. The charging at the constant current was done. When a predetermined voltage was reached, this voltage was retained. Thus, a constant-voltage charging mode was entered, and the current decreased (this is known as trickle charging). When a predetermined time has passed, the constant-current mode is regained, and discharging occurs. As the discharging progresses, the accumulated electric charge decreases. The voltage decreases. Finally, the discharging continues up to 0 V. (a) of FIG. 5 shows a case where the applied voltage is 4.0 V. (b) shows the results of the first cycle in a case where the applied voltage is 3.75 V. The nonporous carbon used for electrodes is nonporous carbon [A704804+504H] prepared using petroleum pitch-based carbon (raw material carbon A) as the raw material carbon in the case (a), the pitch-based carbon being made infusible. The d$_{002}$ was 0.360 nm. The specific surface area was about 100 m$^2$/g. The relaxation component ratio was less than 0.17. In the case of (b), the carbon was nonporous carbon [B704804S+504H] prepared using needle coke (raw material carbon B) as the raw material carbon, the needle coke being derived from petroleum coke. The d$_{002}$ was 0.360 nm. The specific surface area was about 60 m$^2$/g. The relaxation component ratio was less than 0.05.

Figure 6:
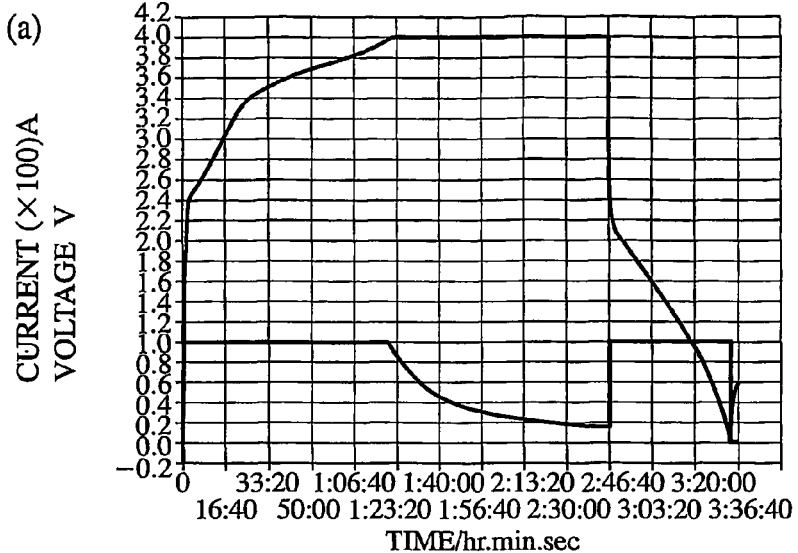
FIG. 6 shows graphs showing the charge-discharge characteristics of electric double-layer capacitors of the invention during initial charging (first cycle) at a set voltage of 4.0 V, the capacitors using an electrolyte solution in which a liquid electrolyte of EMI•BF$_4$ and an organic solvent have been mixed at a volume ratio of 1:1. In the figure, (a) shows cases where the organic solvent is propylene carbonate (PC), (b) shows cases where the organic solvent is γ-butyrolactone (GBL), and (c) shows cases where the organic solvent is ethylene carbonate (EC).
Figure 6:
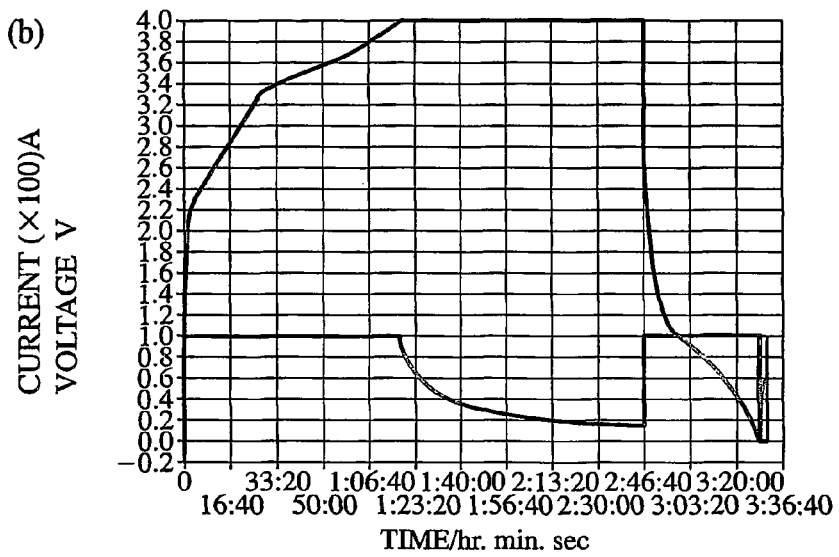
Figure 6:
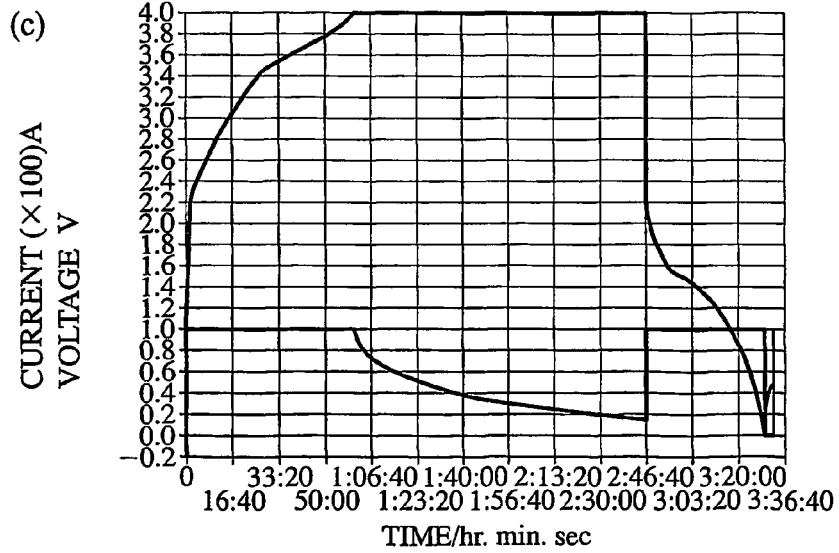

FIG. 6 is a case showing the charging and discharging characteristics in a case where an electrolyte solution is used as a liquid electrolyte. In the electrolyte solution, EMI•BF$_4$ and an organic solvent are mixed at a volumetric ratio of 1:1. The set voltage is 4.0 V. In the figure, (a) indicates a case where the organic solvent is propylene carbonate (PC). (b) indicates a case where the organic solvent is γ-butyrolactone (GBL). (c) indicates a case where the organic solvent is ethylene carbonate (EC). The nonporous carbon used in the electrodes is nonporous carbon [A704804+504H] prepared using petroleum pitch-based carbon (raw material carbon A) as the raw material carbon, the pitch-based carbon being made infusible. The d$_{002}$ was 0.360 nm. The specific surface area was about 100 m$^2$/g. The relaxation component ratio was less than 0.17.

Figure 7:
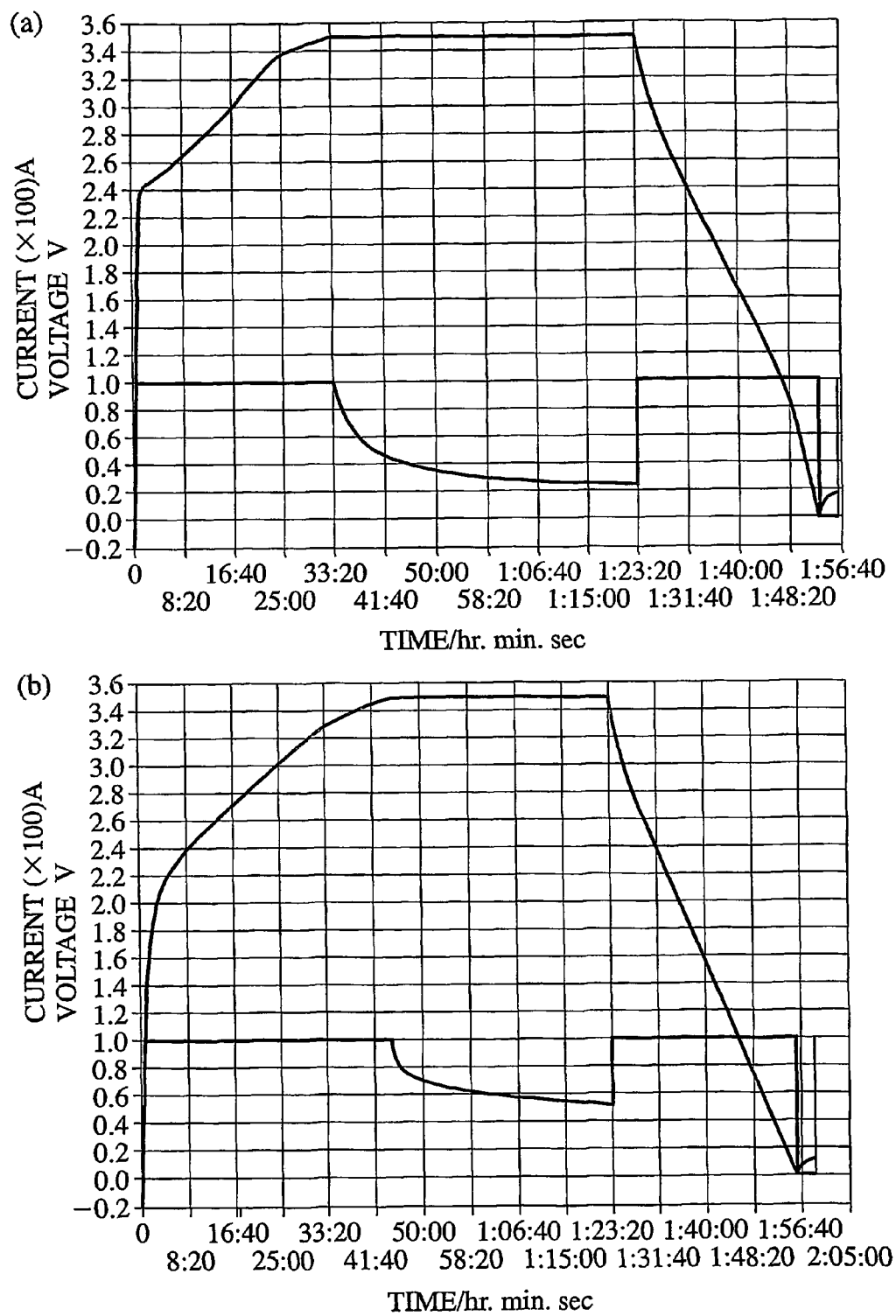
FIG. 7 shows graphs showing the charge-discharge characteristics of electric double-layer capacitors of the invention during initial charging (first cycle) at a set voltage of 3.5 V, the capacitors using an electrolyte solution in which a liquid electrolyte of EMI•BF$_4$ and an organic solvent have been mixed at a volume ratio of 1:1. In the figure, (a) shows cases where the organic solvent is propylene carbonate (PC) and (b) shows cases where the organic solvent is acetonitrile (AN).

In FIG. 7, an electrolyte solution in which EMI•BF$_4$ and an organic solvent are mixed at a volumetric ratio of 1:1 is used as a liquid electrolyte, in the same way as in FIG. 6. In this case, the set voltage is 3.5 V. In the figure, (a) indicates a case where the organic solvent is propylene carbonate (PC) and (b) indicates a case where the organic solvent is acetonitrile (AN). The nonporous carbon used in the electrodes is the same as in the case of FIG. 6.

In FIGS. 5–7, charging and discharging tests were performed at a constant current of 10 mA. Since the diameter of each electrode is 20 mm, the current density is 3.18 mA/cm$^2$. Voltage and current are plotted against the elapsed time from the start of charging. Also, it is shown that the internal resistance increases as the voltage drop at the start of discharging increases after a given voltage is maintained (trickle charging).

FIGS. 5–7 reveal the following. That is, where a liquid electrolyte is used alone as an electrolyte, the voltage increased rapidly up to about 2.7 to 2.9 V for two cases where the applied voltage was set to 4.0 V and 3.75 V, respectively. Then, the voltage increased at a somewhat milder rate but reached a given voltage almost linearly. It can also be seen that the voltage drop at the start of discharging is smaller (FIG. 5).

On the other hand, where an electrolyte solution consisting of a liquid electrolyte dissolved in an organic solvent is used, the characteristics vary depending on the applied voltage. That is, in any case, the intercalation start voltage is smaller than the case where a liquid electrolyte is used alone by 2.0 to 2.4 V because the organic solvent having a small molar volume is used. It can be seen that when the applied voltage is set to 4.0 V, the rate of increase of voltage becomes milder around the applied voltage of 3.3 to 3.5 V. After charging at 4.0 V, the voltage drops rapidly at the start of discharging, and the internal resistance increases (FIG. 6). Meanwhile, where the applied voltage is set to 3.5 V, the aforementioned phenomenon does not take place. It is observed that charging and discharging characteristics similar to those obtained in the case of FIG. 5 are shown (FIG. 7).

This phenomenon can be interpreted as follows. Where an organic solvent is used, co-intercalation with solvent molecules prevails up to 3.5 V. At higher voltages of 3.5 to 4.0 V, EMI$^+$ alone intercalates. That is, solvent ions and electrolyte ions (EMI$^+$) coexist within the narrow regions and so only the electrolyte ions (EMI$^+$) are attracted into still narrower spaces between layers of graphene. As a result, only the solvent molecules are left. This cuts off the ion conductivity and creates a large internal resistance during discharging. In consequence, a voltage drop is caused.

Where a liquid electrolyte is used, if only electrolyte ions (EMI$^+$) are attracted into still narrower spaces between layers of graphene, remaining electrolyte ions (EMI$^+$) still exist. Therefore, the ion conductivity is prevented from being cut off. Consequently, it can be seen that no large internal resistance occurs during discharging.

The electric double-layer capacitor of Patent Laid-Open No. 2002-25867 shows such characteristics that the volume swells when a voltage is applied. If a pressure resisting the pressure produced by the expansion of the electrodes is applied externally, and if this volume expansion of the electrodes is completely suppressed, the capacitance created between the electrodes is not different from that created when free expansion is allowed. However, where actually applied to a device, if the pressure (hereinafter referred to as the "expansion pressure") applied to the collectors by the volume expansion of the nonporous carbon due to a voltage application when the distance between both collectors is fixed is made smaller, more preferable results arise. Accordingly, this expansion pressure about the electric double-layer capacitor of the invention has been discussed.

FIG. 8 is a chart showing the results of measurements of the expansion pressures in cells fabricated using various kinds of nonporous carbons. In the figure, A and B show the results in cases where liquid electrolyte EMI•BF$_4$ was used alone. In the figure, C indicates the results of a case where about 1.0 mol/L solution (a mixture solvent of acetonitrile and propylene carbonate (volumetric ratio of 1:1) of Et$_3$MeN•BF$_4$ was used as a liquid electrolyte. The nonporous carbon used for the used electrodes is nonporous carbon [B704804S+504H] prepared using needle coke (raw material carbon B) as the raw material carbon, the needle coke being derived from petroleum coke. The d$_{002}$ is 0.360 nm. The specific surface area is about 60 m$^2$/g. The relaxation component ratio is less than 0.05.

Then, with respect to each fabricated cell, the volume in the direction of electrode was restricted as shown in FIG. 9. The produced pressure was measured using a jig that can monitor the pressure (Patent Laid-Open No. H11-317333). The chart of FIG. 8 shows the results of the measurements. In the figure, A is the recording of variations in the voltage produced across a strain gauge in a case where initial charging was done at a set voltage of 3.75 V and then charging and discharging were repeated at a set voltage of 3.3 V. In the figure, B and C indicate cases where charging and discharging were repeated also at a set voltage of 3.3 V. Furthermore, as shown in the figure, expansion pressures and the amount of volume expansions when no restriction is made can be known from variations in the voltage.

FIG. 8 shows that the expansion pressures in the cells using the liquid electrolyte EMI•BF$_4$ of the present application are smaller by about 30% than in the case where asymmetric ammonium salt Et$_3$MeN•BF$_4$ is used. It is considered that this is due to difference in molecular structure between cations. That is, cations EMI of the present application assume a planar structure, while cations Et$_3$MeN of an ammonium salt assume a three-dimensional structure.

Where the volume of a carbon electrode expands, if the capacitance increases, the capacitance per unit volume is canceled and so when an actual device is manufactured, it is desirable to provide a volume-limiting means for suppressing the volume expansion in the direction of electric field. For example, where a sheetlike electrode is curled up and received in a cylindrical container, the expansion pressure is directed toward the outer periphery from the center. Therefore, the sheet is received in a cylinder of polymer film having high tensile strength such as sheet of fluorocarbon or polyimide. In the case of an overlapped planar electrode, the sheet is sandwiched between presser plates of high rigidity. Then, the sheet is similarly received in a baglike polymer sheet having high tensile strength such as fluorocarbon, polyimide, or polyamide, thus suppressing volume expansion. Alternatively, the purpose can be achieved by receiving the sheet into a container of aluminum alloy having high rigidity, doing initial charging, and then sealing the container.

Then, the temperature characteristics of the capacitance of the electric double-layer capacitor of the invention were discussed. The results are shown in FIG. 10. FIG. 10 is a graph showing the V-C characteristics of an electric double-layer capacitor (cell preparation No. j533) at 50° C. The capacitor uses nonporous carbon [A704804+504H] (with d$_{002}$ of 0.360 nm, specific surface area of about 100 g/m$^2$, and relaxation component ratio of less than 0.17) prepared using petroleum pitch-based carbon (raw material carbon A) as the raw material carbon, the pitch-based carbon being made infusible. The capacitor uses EMI•BF$_4$ as the electrolyte.

It can be seen from FIG. 10 that when the operating temperature is elevated, the capacitance increased compared with the case of room temperature (FIG. 2, cell preparation No. i332).

It can be understood that where the operating temperature of the cell is elevated, the internal resistance of the capacitor decreases and the capacitance increases. It is known, on the other hand, that deterioration of the cell accelerated because increase in the operating temperature activates the electrochemical reaction between the impurity and electrolyte within the system. In the electric double-layer capacitor of the invention, however, the capacitance at the tenth cycle does not suffer from a rapid decrease as described in an embodiment described later. Also, the cell less deteriorates. The cell is relatively stable.

It is generally known that in electric double-layer capacitors using the prior art activated carbon, the capacitance hardly increases if the operating temperature of the cell is elevated but rather the life is shortened rapidly, for the following reasons. It is almost impossible to remove residual functional groups and so reaction between the electrolyte and solvent is more likely to occur at high operating voltages. This is promoted with increasing the temperature. In contrast, in nonporous carbons, residual functional groups can be reduced greatly. Therefore, in the electric double-layer capacitor according to the invention, if the operating temperature is increased, life shortening does not occur. Having a wide range of operating temperature is a major feature of the electric double-layer capacitor according to the invention.

As described so far, the electric double-layer capacitor of the present invention provides a device having a high withstand voltage, operating over a wide range of temperatures, and having a large capacitance owing to two mechanisms, i.e., formation of an electric double layer owing to electrolyte ions and an electrochemical reaction, i.e., intercalation mainly of electrolyte ions themselves into the carbon tissue by application of a still higher voltage in a case where a liquid electrolyte is used alone. Where a solution of a liquid electrolyte is used as a electrolyte solution, if the capacitor is used at an applied voltage not exceeding 3.5 V, a device having a larger capacitance than those of electric double-layer capacitors using activated carbon and electric double-layer capacitor described in Patent Laid-Open No. 2002-25867 has been obtained.

EXAMPLES

The present invention is hereinafter described in further detail using its embodiments.

Examples 1–18 and Comparative Examples 1–5

Nonporous carbons were prepared by the method described in Patent Laid-Open No. 2002-25867. Alternatively, a transition metal such as Ni was used as a catalyst during hydrogenation (Patent Laid-Open No. 2002-362912) in addition to the above-described method. Then, with respect to each obtained nonporous carbon, the average interplanar spacing $d_{002}$ was measured by XRD. The specific surface area was measured by the BET method. The relaxation time components were measured by pulsed NMR spectroscopy. Meanwhile, using these nonporous carbons, electric double-layer capacitors were fabricated in the manner described below.

Where a liquid electrolyte consisting of cations capable of assuming a planar molecular structure and anions having a small ionic van der Waals volume is used as an electrolyte, nonporous carbons which had average interplanar spacings $d_{002}$ of 0.350 to 0.360 nm and which were newly found to be usable were prepared mainly by increasing the temperature of hydrogenation. That is, one type of used nonporous carbon was prepared using petroleum pitch-based carbon (raw material carbon A) processed to be infusible. The temperature of the hydrogenation was increased from 500° C. to 700° C. [A704804+704H]. Another type was prepared using petroleum pitch-based carbon (raw material carbon A) processed to be infusible. The carbon was hydrogenated at 700° C. under pressurized hydrogen of 90 kg/cm$^2$ [A704804+704(90)H]. (With respect to nonporous carbons hydrogenated under increased pressure, the pressure value of the processing pressure (kg/cm$^2$) is shown within the parentheses ( ) to indicate the hydrogenation under increased pressure.) Further types were prepared using needle cokes (raw material carbons C) obtained from different sources, needle cokes being derived from petroleum cokes. The temperature of the hydrogenation was 700° C. [C704804+704H]. The average interplanar spacings $d_{002}$ of these nonporous carbons as measured by XRD, their specific surface areas, and relaxation component ratios are listed in Table 1. The XRD measurements were performed within air using powdered samples and the CuKα line (with a target of Cu and exciting voltage of 30 kV).

TABLE 1

| Nonporous carbon | $d_{002}$ (nm) | Specific surface area (m$^2$/g) | Relaxation component ratio |
| --- | --- | --- | --- |
| A704804 + 704H | 0.355 | about 46 | 0.10 |
| A704804 + 704(90)H | 0.354 | about 40 | below 0.05 |
| C704804 + 704H | 0.356 | about 60 | 0.20 |

The average interplanar spacing $d_{002}$ varies depending on the thermal processing temperature within hydrogen gas stream (reducing gas stream). The spacing decreases with increasing the temperature. The amount of variation was less than 0.05 nm in a case where the temperature range is below 800° C.

(1) Preparation of Carbon Electrodes

The nonporous carbons including those having average interplanar spacings $d_{002}$ of 0.350 to 0.360 nm obtained in this way were recovered into aluminum bats and heated and vacuum-dried at 200° C. up to 0.1 Torr for 2 to 4 hours. Then, the carbons were moved into mortars, and carbon black available as Denka Black from Denki Kagaku Kogyo Co., Ltd., and PTFE binder available from Mitsui-DuPont Fluorochemicals Co., Ltd. were added. The materials were mixed and kneaded together with pestles. One example of the ratio by weight of the carbon, carbon black, and PTFE binder is 10:0.5:0.25. Then, pieces of the kneaded carbons showing stickiness were wrapped in aluminum foil until they were rolled into sheets. Then, they were applied to hot rollers. The aluminum foil was removed. They were finished into sheetlike forms.

Then, each sheet described above was cut into a size having a diameter of 20 mm with a punching jig such that the thickness reached about 0.2 mm and used as a carbon electrode for testing. The thickness and weight were measured to assemble a device using the molded carbon electrodes. Their electrode densities were all within the range of from 0.8 to 1.1 g/cm$^3$. The obtained carbon electrodes were separately placed on dishes for impregnation. The electrodes were placed into a heating and vacuum drying machine directly connected to a glove box, together with glass fibers GA-100 or GA-55. They were heated and vacuum-dried at 250° C. up to $5\times10^{-7}$ Torr for about 24 hours. Then, they were moved into a vacuum impregnation vessel. This vessel was pumped down to 0.1 Torr. Then, the electrolyte injection cock was opened, and a liquid electrolyte passed through an active aluminum column or an electrolyte solution consisting of a liquid electrolyte dissolved in a given organic solvent was injected. The amount of injection was such that each carbon electrode was immersed sufficiently. (Where a separator (CTW-GA55-CTW) previously nipped by hard paper is used, the hard paper will change into brown color when 250° C. is reached. In this case, therefore, the carbon electrodes were vacuum-dried at 120 to 150° C. at about $5\times10^{-7}$ Torr for about 24 hours and then stored within the glove box. These are used and operations on them are performed similarly.) The electrodes were visually checked through an access window formed near the top of the vessel. Confirmations were made from variations in the liquid level in the electrolyte solution bottle.

After adding the impregnation electrolyte or electrolyte solution, the cock was operated to pump down the inside of the vessel again. At this time, emission of gas from inside the carbon and other locations was observed as bubbles.

The emission of bubbles ceased after a lapse of about 3 to 5 minutes. Then, the pressure was released by operating the cock. The cover of the vessel was opened, and the carbon electrodes and the separator (GA-100, GA-55, or CTW-GA55-CTW) containing the electrolyte solution were taken out and assembled into cells for testing by the following steps.

With respect to the used liquid electrolyte EMI•BF$_4$, an aluminum laminate packed product made by Stella Chemifa Corporation was opened in the glove box and used intact. An organic solvent that has been sufficiently dried and refined was used.

(2) Assembly of Devices (Cells for Testing)

Surface-roughened aluminum collector electrodes obtained by presealing extractor electrode portions and a bag of laminate sheet containing aluminum were prepared. Collector electrode, carbon electrode, CTW, GA55 or GA100 CTW, carbon electrode, and collector electrode were overlapped in this order. Alternatively, collector electrode, carbon electrode, CTW-GA55-CTW electrolyte solution retainer, carbon electrode, and collector electrode were overlapped in this order. These components were nipped by a jig and inserted into the laminate sheet bag containing aluminum.

Then, this was clamped, taken out of the glove box, and vacuum-packed using a jig. A space for storing gas produced when an over-voltage was applied was previously held in the poly bag.

As one method of assembling devices, the above-described electrodes and separator were placed in a vacuum impregnation vessel and the assembly was performed. Besides this method, devices (cells for testing) were assembled using the following method. In particular, electrodes, separator, and collector electrodes dried by the aforementioned method were assembled and received into a previously prepared bag of laminate sheet containing aluminum. After thermally sealing the extractor electrode portions, a liquid electrolyte or electrolyte solution was injected from the other end of the bag, and this bag was put into the evacuated vessel. The whole was pumped down so that the liquid reached every corner of all the parts of the electrodes. Then, the device was taken out of the vessel. The other end of the bag was thermally sealed within the glove box. This method is referred to as "liquid injection method" and indicated by an added character "i". Newly fabricated devices (cells for testing) are indicated by an added character "j" instead of "i".

Charging and discharging tests were conducted using the obtained cells for testing. Electrical characteristics including capacitances were measured.

The measurements were carried out by the following two methods.

(a) Sequentially Programmed Measurements

An automated programmed method of measurements in which charging and discharging were done at a constant current of 10 mA while increasing the applied voltage in steps of 0.5V and increasing the trickle charging time in steps of 500 seconds. When the maximum applied voltage of 4.0 V or 3.75 V was exceeded, similar steps of charging and discharging were carried out while reducing the voltage and time.

(b) Initial Charging and Load Test

An automated measuring method. As initial charging, the first cycle of charging was performed at 10 mA up to 4.0 V (or, in some cases, up to 3.75 V). The trickle charging time was set longer (about 5000 seconds or longer). Then, discharging was done at 10 mA up to 0 V. After the completion of the initial charging, charging was done at 10 mA up to a voltage identical to or slightly lower than the initial voltage. After appropriate trickle charging, discharging was done at 10 mA with 0 V (or 0.5 to 0.8 V; that is, substantially more than 90% of the storage energy was discharged). This sequence of steps was repeated a specified number of times.

The capacitances plotted against the applied voltage as shown in FIGS. 1, 2, and 10 and the storage and discharge energies plotted against the applied voltage in FIG. 3 are the results of measurements performed by the method (a). The intercalation start voltages of FIG. 4 and the results of cycle tests of FIG. 11 were measured by the method (b). The measuring temperature was essentially room temperature but some measurements were performed at 50° C.

The capacitance was calculated, using a value that was 50% of the total discharge current from the start of discharging, from $Q=(1/2) \times CV^2$ and converted into dry weight and volume of the positive and negative electrodes. The internal resistance during discharging was a value intrinsic to the tested cell such as the used electrode. It is indicated for reference.

Also, devices having electrodes using nonporous carbons were prepared similarly. A solution of alkyl ammonium salt was used as the electrolyte solution (Comparative Examples 1–3). A device using activated carbon (having a specific surface area of 1015 $m^2/g$ and a maximum micropore frequency of 0.74 nm) instead of nonporous carbon and employing a liquid electrolyte was prepared as a comparative example. Petroleum pitch made infusible was used as a raw material carbon and activated with water vapor (Comparative Example 4). The petroleum pitch was activated with water vapor. Furthermore, a solution of an alkyl ammonium salt was used as the electrolyte solution for electrodes prepared using the above-described activated carbon. This is indicated as Comparative Example 5. The obtained results are listed in Table 2. In assembling the devices (cells for testing), some devices (cells for testing) were fabricated by inserting the carbon electrodes and separator into the vacuum impregnation vessel. The other devices (cells for testing) were fabricated by the "liquid injection method". These two kinds of devices were substantially identical in measured electrical characteristics such as capacitance. Therefore, only the results of the devices (cells for testing) fabricated by the "liquid injection method" that is a simple method are shown in the table.

TABLE 2

|  | Carbon material | Electrolyte solution | |
|---|---|---|---|
|  |  | Electrolyte | Solvent |
| Example 1 | A704804 + 504H | EMI.BF$_4$ | no |
| Example 2 | B704804S + 504H[1] | EMI.BF$_4$ | no |
| Example 3 | B704804 + 504H[2] | EMI.BF$_4$ | no |
| Example 4 | B704804 + 504H[3] | EMI.BF$_4$ | no |
| Example 5 | B704804S + 504H[1] | EMI.BF$_4$ | no |
| Example 6 | A704804 + 504H | EMI.BF$_4$ | no |
| Example 7 | B704804S + 504H[1] | EMI.BF$_4$ | PC |
| Example 8 | B704804S + 504H[1] | EMI.BF$_4$ | GBL |
| Example 9 | B704804S + 504H[1] | EMI.BF$_4$ | EC |
| Example 10 | B704804S + 504H[1] | EMI.BF$_4$ | PC |
| Example 11 | B704804S + 504H[1] | EMI.BF$_4$ | AN |
| Example 12 | A704804 + 504H | EMI.BF$_4$ | no |
| Example 13 | A704804 + 704H | EMI.BF$_4$ | no |
| Example 14 | C704804 + 704H | EMI.BF$_4$ | no |
| Example 15 | C704804 + 704H | EMI.BF$_4$ | no |
| Example 16 | A704804 + 704H | EMI.BF$_4$ | no |
| Example 17 | C704804 + 704H | EMI.BF$_4$ | no |
| Example 18 | A704804 + 504H | EMI.BF$_4$ | no |
| Comparative Example 1 | A704804 + 504H | Et$_4$N.BF$_4$ | AN + EC[5] |
| Comparative Example 2 | A704804 + 504H | Et$_3$MeN.BF$_4$ | AN + EC[5] |
| Comparative | B704804S + 504H[1] | Et$_3$MeN.BF$_4$ | AN + EC[5] |

TABLE 2-continued

| | | | |
|---|---|---|---|
| Example 3 | | | |
| Comparative Example 4 | activated carbon[4] | EMI.BF$_4$ | no |
| Comparative Example 5 | activated carbon[4] | Et$_4$N.BF$_4$ | AN + EC[5] |

| | 1st cycle | | | |
|---|---|---|---|---|
| | Capacitance F/g | Capacitance F/cm$^3$ | Applied voltage V | Internal resistance Ω |
| Example 1 | 55.7 | 52.3 | 4.0 | 9.9 |
| Example 2 | 46.4 | 41.3 | 4.0 | 12.8 |
| Example 3 | 57.6 | 46.1 | 4.0 | 11.9 |
| Example 4 | 55.9 | 46.4 | 4.0 | 14.3 |
| Example 5 | 39.4 | 31.4 | 3.75 | 26.6 |
| Example 6 | 46.7 | 42.2 | 4.0 | — |
| Example 7 | 79.5* | 71.0* | 4.0 | 132 |
| Example 8 | 28.5* | 25.2* | 4.0 | 107 |
| Example 9 | 67.1* | 57.8* | 4.0 | 140 |
| Example 10 | 51.2 | 46.2 | 3.5 | 5.8 |
| Example 11 | 43.3 | 42.9 | 3.5 | 4.5 |
| Example 12 | 65.4 | 55.4 | 4.0 | — |
| Example 13 | 59.7 | 59.6 | 4.0 | — |
| Example 14 | 54.6 | 44.0 | 4.0 | — |
| Example 15 | 52.6 | 40.9 | 4.0 | — |
| Example 16 | 68.1 | 71.5 | 4.0 | — |
| Example 17 | 49.4 | 41.7 | 4.0 | — |
| Example 18 | 57.8 | 50.1 | 4.0 | — |
| Comparative Example 1 | 38.5 | 34.5 | 3.75 | 10.3 |
| Comparative Example 2 | 39.1 | 38.0 | 3.75 | 10.4 |
| Comparative Example 3 | 38.4 | 30.6 | 4.0 | 42.3 |
| Comparative Example 4 | 31.3 | 17.7 | 3.5 | 7.0 |
| Comparative Example 5 | 23.2 | 17.0 | 3.75 | 40.6 |

| | 10th cycle | | | | |
|---|---|---|---|---|---|
| | Capacitance F/g | Capacitance F/cm$^3$ | Applied voltage V | Internal resistance Ω | Cell preparation No. |
| Example 1 | 41.3 | 38.7 | 3.5 | 6.2 | i322 |
| Example 2 | 38.3 | 34.1 | 3.5 | 7.8 | i613 |
| Example 3 | 48.2 | 38.6 | 3.5 | 12.6 | i731 |
| Example 4 | 44.9 | 37.2 | 3.5 | 13.8 | i721 |
| Example 5 | 33.6 | 26.9 | 3.3 | 19.9 | i521 |
| Example 6 | 36.9 | 33.9 | 3.5 | 5.7 | i612 |
| Example 7 | 39.4 | 35.2 | 3.5 | 23.6 | i622 |
| Example 8 | 35.5 | 31.3 | 3.5 | 20.8 | i513 |
| Example 9 | 42.0 | 36.2 | 3.5 | 16.9 | i531 |
| Example 10 | 42.0 | 37.9 | 3.5 | 7.4 | i623 |
| Example 11 | 39.0 | 39.4 | 3.5 | 3.7 | i633 |
| Example 12 | 42.5 | 36.0 | 3.5 | 3.4 | j533[6] |
| Example 13 | 36.3 | 34.5 | 3.5 | 4.6 | j233[6] |
| Example 14 | 43.6 | 35.2 | 3.5 | 3.0 | j222[6] |
| Example 15 | 41.1 | 31.9 | 3.5 | 4.3 | j223 |
| Example 16 | 36.2 | 37.7 | 3.5 | 5.8 | j013[6] |
| Example 17 | 39.3 | 33.2 | 4.0 | 15.0 | j711 |
| Example 18 | 48.8 | 42.4 | 4.0 | 11.5 | j611 |
| Comparative Example 1 | 35.2 | 31.6 | 3.3 | 5.9 | i221 |
| Comparative Example 2 | 33.9 | 33.0 | 3.3 | 8.8 | i233 |
| Comparative Example 3 | 31.8 | 25.3 | 3.5 | 41.8 | i423 |
| Comparative | 24.0 | 13.6 | 3.3 | 6.5 | i412 |

TABLE 2-continued

| | | | | | |
|---|---|---|---|---|---|
| Example 4 Comparative Example 5 | 21.8 | 16.0 | 13.0 | 19.7 | — |

Notes
[1-3]Petroleum coke-based raw material carbons B having different lot numbers
[4]porous carbon having a specific surface area of 1015 m$^2$/g
[5]mixture solvent of equal volumes of components (1:1) having an electrolyte concentration of 1.0 mol/L
[6]cell test temperature of 50° C.

In the column of electrolytes of the table, in cases where an electrolyte solution obtained by dissolving EMI•BF$_4$ in an organic solvent was used, a mixture of equal volumes of EMI•BF$_4$ and organic solvent was used. A indicating the carbon species of the raw material of nonporous carbon is a petroleum pitch-based carbon material. B indicating the carbon species of raw material denotes needle cokes derived from petroleum coke. These raw material carbons B were prepared using three kinds of raw material carbons having different manufacturing lot numbers. These raw material carbons B are identified with notes 1–3. Also, C indicating raw material carbon species indicates needle cokes derived from petroleum cokes available from different sources.

According to Table 2, devices according to Embodiments using nonporous carbons having average interplanar spacings $d_{002}$ of 0.350 to 0.380 nm have larger capacitances and smaller internal resistances than the Comparative Examples. It can also be seen that the applied voltage is as high as 4.0 V. Furthermore, it can be observed that where the test temperature was set to 50° C., stable performance is shown in the same way as in cases of room temperature.

Examples 7–9 in the table indicate cases where the electrolyte solutions contained organic solvents. The first cycle of charging was performed at 4.0 V. In these cases, the internal resistances increased greatly to 107 to 140 Ω in the first cycle and so the results of the measurements themselves (with * added in FIG. 2) of the capacitances obtained by the calculational method described above are substantially meaningless. However, when charging and discharging were subsequently repeated at 3.5 V, the value of the capacitance at the tenth cycle was comparable to those obtained by other examples (Examples 10, 11 where charging and discharging were repeated at 3.5 V using an electrolyte solution employing a solvent and other examples where a liquid electrolyte was used alone). Thus, it can be seen that even if the electric double-layer capacitor according to the invention suffers from a transient increase in the internal resistance due to over-voltage, no problems occur at all during subsequent charging and discharging.

Moreover, it can be seen that in systems using no solvent, substantially identical capacitances are shown in a case where the first cycle was performed at an applied voltage of 4.0 V, then the applied voltage was set to 3.5 V, and the tenth cycle was evaluated and also in a case where 4.0 V was subsequently applied and the tenth cycle was evaluated.

Then, the cycle characteristics of the obtained electric double-layer capacitors were discussed. As an example, a device was fabricated using a nonporous carbon [B704804+504H]. The device was charged and discharged repeatedly 100 times with varying applied voltage. In FIG. 11, variation of the capacitance is plotted against the number of cycles. In the figure, (A) indicates a case where the applied voltage was set to 4.0 V, and (B) indicates a case where the applied voltage was set to 3.5 V. It can be seen from FIG. 11 that where the applied voltage was set to 4.0 V, the capacitance decreased somewhat with increasing the number of cycles but was quite stable at the applied voltage of 3.5. Hence, the device has excellent cycle characteristics.

Electric double-layer capacitors of the present invention can be summarized as in FIG. 3 from the results and description given so far. In the table, the withstand voltage is a recommended applied voltage that can be used safely and brings out the performance of the electric double-layer capacitors of the invention sufficiently.

TABLE 3

| | Electrode carbon material | Electrolyte solution | | Capacitance (F/cm$^3$) | Withstand voltage (V) | Discharge energy density (Wh/L) |
|---|---|---|---|---|---|---|
| | | Electrolyte | Solvent | | | |
| Inventive | nonporous carbon | EMI · BF$_4$ | no (neat) | 46 | 4 | 115 |
| | nonporous carbon | EMI · BF$_4$ | AN, PC, EC, or the like | 38 | 3.3 | 57 |
| Prior examples | nonporous carbon | Et$_3$MeN · BF$_4$ | AN + EC | 32 | 3.3 | 48 |
| | porous activated carbon | Et$_3$MeN · BF$_4$ | AN + EC | 15 | 2.7 | 15 |
| | porous activated carbon | EMI · BF$_4$ | no (neat) | 14 | 3.3 | 21 |

It can be seen from FIG. 3 that electric double-layer capacitors of the present invention have larger discharge energy densities than the prior art ones.

Based on the results of the examples described so far, the electric double-layer capacitor of the present invention is described comprehensively. In the electric double-layer capacitor according to the invention and having a combination of electrodes including an active material of nonporous carbon and a liquid electrolyte, electrolyte ions form an electric double layer up to a certain applied voltage. At higher applied voltages, mainly electrolyte ions themselves alone intercalate into the carbon tissue. In this way, electrochemical energy is stored by this electrochemical behavior.

Thus, a device based on the novel mechanism is offered.

When operated at an applied voltage of 3.3 V that is the operation voltage for the prior art electric double-layer capacitors, the electric double-layer capacitor of the invention has a capacitance that is greater than that of the prior art device using a quarternary ammonium salt solution as the electrolyte solution by a factor of about 1.2. Since the device can be operated at a higher voltage, an energy density about 2.4 times larger can be accomplished. That is, the electric double-layer capacitor of the invention has a large capacitance and a high withstand voltage. The energy density is quite high. Furthermore, the internal resistance during discharging is small. Consequently, a device having an excellent power density is offered. Further, the electric double-layer capacitor of the invention is relatively stable and shows a higher capacitance even when the operating temperature is high by removing residual functional groups. A device that achieves a high energy density is offered.

Where an electrolyte solution consisting of a liquid electrolyte dissolved in an organic solvent is used, if an applied voltage of 4.0 V is used, the internal resistance at the start of discharging increases because of the mechanism. No problems take place as long as an applied voltage of 3.5 is used. A device having a higher capacitance than conventional, i.e., higher energy density and higher power density, is offered. If a voltage exceeding 3.5 V is applied across both electrodes and the internal resistance during discharging increases, an electric double layer is formed again in the next charging process in this device. Therefore, the device can return to the original state of low internal resistance during discharging. That is, this means that the device is substantially equipped with a buffer function against an excessive applied voltage exceeding the rated voltage. An electric double-layer capacitor based on a new mechanism having high reliability and safety is offered.

While we have shown presently preferred embodiments of the present invention, it will be understood by persons skilled in the art that the invention may be otherwise embodied within the scope of the following claims.

The invention claimed is:

1. An electric double-layer capacitor comprising:
   positive and negative electrodes containing a nonporous carbon as an electrode active material, the nonporous carbon having well grown, multiple layers of graphene having an average interplanar spacing $d_{002}$ of 0.350 to 0.380 nm; and
   an electrolyte with which the positive and negative electrodes are impregnated;
   wherein said nonporous carbon has been obtained by activating easily graphitizable carbon that is produced by calcining needle coke or pitch made infusible; and
   wherein said electrolyte is a liquid electrolyte having a planar molecular structure.

2. An electric double-layer capacitor as set forth in claim 1, wherein the liquid electrolyte is a salt consisting of cations and anions, the cations being made of a compound given by the following general formula

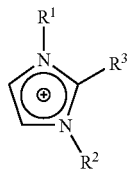

[Chemical Formula 1]

where $R^1$ and $R^2$ are straight-chained alkyl groups respectively having numbers of carbon atoms of 1 to 5 and $R^3$ is hydrogen or a straight-chained alkyl group having a number of carbon atoms of 1 to 5, the anions having van der Waals volumes in the range of 0.01 to 0.06 $nm^3$.

3. An electric double-layer capacitor as set forth in claim 2, wherein the cations are 1,3-dialkylimidazolium or 1,2,3-trialkylimidazolium.

4. An electric double-layer capacitor as set forth in claim 2, wherein the anions are $BF_4^-$, $PF_6^-$, $AsF_6^-$, $ClO_4^-$, or $CF_3SO_3^-$.

5. An electric double-layer capacitor as set forth in claim 1, wherein when a short relaxation time component $T_2$ of 20 to 50 μsec (Gaussian type), a moderate relaxation time component $T_2$ of 50 to 400 μsec (Lorentzian type), and a long relaxation time component $T_2$ of 500 to 2000 μsec (Lorentzian type) which indicate variations in bonding state of hydrogen remaining in carbon tissue of the nonporous carbon and are observed by $^1H$ resonance making use of pulsed NMR spectroscopy are found, the ratio of the moderate relaxation time component to the short relaxation time component is less than one-third.

6. An electric double-layer capacitor as set forth in claim 1, wherein the nonporous carbon has a specific surface area of less than 270 $m^2/g$.

7. An electric double-layer capacitor as set forth in claim 6, wherein the specific surface area is less than 100 $m^2/g$.

8. An electric double-layer capacitor comprising:
   positive and negative electrodes containing a nonporous carbon as an electrode active material, the nonporous carbon having well grown, multiple layers of graphene having an average interplanar spacing $d_{002}$ of 0.350 to 0.380 nm; and
   an electrolyte solution with which the positive and negative electrodes are impregnated;
   wherein said nonporous carbon has been obtained by activating easily graphitizable carbon that is produced by calcining needle coke or pitch made infusible; and
   wherein said electrolyte solution is a mixture electrolyte solution of a liquid electrolyte and an organic solvent, said liquid electrolyte having a planar molecular structure.

9. An electric double-layer capacitor as set forth in claim 8, wherein the organic solvent is one selected from the group consisting of propylene carbonate, ethylene carbonate, dimethyl carbonate, diethyl carbonate, dimethoxymethane, diethoxyethane, g-butyrolactone, acetonitrile, and propionitrile or a mixture solvent of at least two selected from the group.

10. An electric double-layer capacitor as set forth in claim 8, wherein the electrolyte solution has an electrolyte concentration of more than 0.5 mol/L.

11. An electric double-layer capacitor as set forth in claim 8, wherein the liquid electrolyte is a salt consisting of cations and anions, the cations being made of a compound given by the following general formula

[Chemical Formula 1]

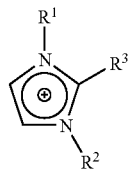

where $R^1$ and $R^2$ are straight-chained alkyl groups respectively having numbers of carbon atoms of 1 to 5 and $R^3$ is hydrogen or a straight-chained alkyl group having a number of carbon atoms of 1 to 5, the anions having van der Waals volumes in the range of 0.01 to 0.06 $nm^3$.

12. An electric double-layer capacitor as set forth in claim 11, wherein the cations are 1,3-dialkylimidazolium or 1,2,3-trialkylimidazolium.

13. An electric double-layer capacitor as set forth in claim 11, wherein the anions are $BF_4^-$, $PF_6^-$, $AsF_6^-$, $ClO_4^-$, or $CF_3SO_3^-$.

14. An electric double-layer capacitor as set forth in claim 8, wherein when a short relaxation time component $T_2$ of 20 to 50 μsec (Gaussian type), a moderate relaxation time component $T_2$ of 50 to 400 μsec (Lorentzian type), and a long relaxation time component $T_2$ of 500 to 2000 μsec (Lorentzian type) which indicate variations in bonding state of hydrogen remaining in carbon tissue of the nonporous carbon and are observed by $^1H$ resonance making use of pulsed NMR spectroscopy are found, the ratio of the moderate relaxation time component to the short relaxation time component is less than one-third.

15. An electric double-layer capacitor as set forth in claim 8, wherein the nonporous carbon has a specific surface are of less than 270 $m^2/g$.

16. An electric double-layer capacitor as set forth in claim 15, wherein the specific surface area is less than 100 $m^2/g$.

* * * * *

UNITED STATES PATENT AND TRADEMARK OFFICE
CERTIFICATE OF CORRECTION

PATENT NO. : 7,180,725 B2
APPLICATION NO. : 10/547495
DATED : February 29, 2007
INVENTOR(S) : Makoto Takeuchi, Akinori Mogami and Katsumi Koike It is certified that error appears in the above-identified patent and that said Letters Patent is hereby corrected as shown below:

Column 13
Line 51, delete "is"

Column 29
Line 61 (claim 1, line 13), before "liquid" insert -- solvent-free ionic --

Column 32
Line 16 (claim 15, line 2) "are" should be -- area --.

Signed and Sealed this

Sixteenth Day of October, 2007

JON W. DUDAS
*Director of the United States Patent and Trademark Office*

UNITED STATES PATENT AND TRADEMARK OFFICE
CERTIFICATE OF CORRECTION

PATENT NO.        : 7,180,725 B2
APPLICATION NO.   : 10/547495
DATED             : February 20, 2007
INVENTOR(S)       : Makoto Takeuchi, Akinori Mogami and Katsumi Koike It is certified that error appears in the above-identified patent and that said Letters Patent is hereby corrected as shown below:

Column 13
Line 51, delete "is"

Column 29
Line 61 (claim 1, line 13), before "liquid" insert -- solvent-free ionic --

Column 32
Line 16 (claim 15, line 2) "are" should be -- area --.

This certificate supersedes Certificate of Correction issued October 16, 2007.

Signed and Sealed this

Thirteenth Day of November, 2007

JON W. DUDAS
*Director of the United States Patent and Trademark Office*